US011123644B2

United States Patent
Amaitis et al.

(10) Patent No.: US 11,123,644 B2
(45) Date of Patent: *Sep. 21, 2021

(54) AMUSEMENT DEVICES INCLUDING SIMULATED COURT GAMES OR ATHLETIC EVENTS

(71) Applicant: INTERACTIVE GAMES LLC, New York, NY (US)

(72) Inventors: Lee Amaitis, Las Vegas, NV (US); Phillip Flaherty, Las Vegas, NV (US); Andrew Garrood, Las Vegas, NV (US)

(73) Assignee: INTERACTIVE GAMES LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,575

(22) Filed: Jul. 6, 2020

(65) Prior Publication Data

US 2020/0330883 A1 Oct. 22, 2020

Related U.S. Application Data

(63) Continuation of application No. 16/202,904, filed on Nov. 28, 2018, now Pat. No. 10,702,782, which is a continuation of application No. 15/250,532, filed on Aug. 29, 2016, now Pat. No. 10,258,890, which is a continuation of application No. 14/467,643, filed on Aug. 25, 2014, now Pat. No. 9,427,669, which is a continuation of application No. 13/160,746, filed on Jun. 15, 2011, now Pat. No. 8,814,695, which is a continuation-in-part of application No. 12/605,826, filed on Oct. 26, 2009, now Pat. No. 9,352,220.

(60) Provisional application No. 61/479,539, filed on Apr. 27, 2011.

(51) Int. Cl.
  *A63F 13/828* (2014.01)
  *G07F 17/32* (2006.01)
  *A63F 13/792* (2014.01)

(52) U.S. Cl.
  CPC .......... *A63F 13/828* (2014.09); *A63F 13/792* (2014.09); *G07F 17/3237* (2013.01); *G07F 17/3244* (2013.01); *G07F 17/3274* (2013.01); *G07F 17/3276* (2013.01); *G07F 17/3288* (2013.01)

(58) Field of Classification Search
  CPC .. A63F 2300/69; A63F 13/828; A63F 13/792; A63F 3/0615
  See application file for complete search history.

(56) References Cited

U.S. PATENT DOCUMENTS

| | | |
|---|---|---|
| 5,018,736 A | 5/1991 | Pearson et al. |
| 5,385,551 A | 1/1995 | Shaw |
| 5,749,785 A | 5/1998 | Rossides |
| 5,830,069 A | 11/1998 | Soltesz et al. |
| 6,371,855 B1 | 4/2002 | Garriloff |

(Continued)

OTHER PUBLICATIONS

U.S. Appl. No. 61/479,539, filed Apr. 27, 2011, Amaitis et al.

(Continued)

*Primary Examiner* — Steve Rowland

(57) ABSTRACT

Some embodiments include a fantasy sports game. In some embodiments, an expected performance value may be determined. In some embodiments, a same player may appear multiple times in a team. Various other embodiments are described.

12 Claims, 8 Drawing Sheets

(56) References Cited

U.S. PATENT DOCUMENTS

| | | | |
|---|---|---|---|
| 1,236,756 | A1 | 2/2009 | Alderucci |
| 1,377,391 | A1 | 2/2013 | Amaitis |
| 8,814,695 | B2 | 8/2014 | Amaitis et al. |
| 9,352,220 | B2 | 5/2016 | Amaitis et al. |
| 9,427,669 | B2 | 8/2016 | Amaitis et al. |
| 2002/0061019 | A1 | 5/2002 | Strachan |
| 2003/0199315 | A1 | 10/2003 | Downes |
| 2004/0230514 | A1 | 11/2004 | Burgis |
| 2004/0266530 | A1* | 12/2004 | Bishop .................. A63F 13/12 463/42 |
| 2005/0064937 | A1 | 3/2005 | Ballman |
| 2005/0181869 | A1 | 8/2005 | Downes |
| 2005/0261043 | A1* | 11/2005 | Slade .................. G06Q 50/34 463/1 |
| 2006/0025208 | A1 | 2/2006 | Ramsey |
| 2006/0105827 | A1 | 5/2006 | Metzger |
| 2006/0205461 | A1 | 9/2006 | LaRocca et al. |
| 2007/0021214 | A1 | 1/2007 | Ma |
| 2007/0021853 | A1 | 1/2007 | Ma |
| 2008/0200254 | A1 | 8/2008 | Cayce |
| 2008/0215168 | A1 | 9/2008 | Charchian |
| 2008/0248849 | A1 | 10/2008 | Lutnick et al. |
| 2008/0254876 | A1 | 10/2008 | Koustas et al. |
| 2008/0280685 | A1* | 11/2008 | Hansen .................. A63F 13/65 463/42 |
| 2009/0023495 | A1 | 1/2009 | Koustas et al. |
| 2009/0026706 | A1 | 1/2009 | St. Clair et al. |
| 2009/0093300 | A1 | 4/2009 | Lutnick |
| 2009/0118703 | A1 | 5/2009 | Orilla |
| 2009/0203447 | A2 | 8/2009 | Hansen et al. |
| 2009/0270155 | A1 | 10/2009 | Glass et al. |
| 2010/0105464 | A1 | 4/2010 | Storm |
| 2010/0203935 | A1* | 8/2010 | Levy .................. G07F 17/3274 463/4 |
| 2010/0285857 | A1 | 11/2010 | Anderson et al. |
| 2010/0311484 | A1 | 12/2010 | Suh et al. |
| 2011/0098093 | A1 | 4/2011 | Amaitis et al. |
| 2012/0009984 | A1 | 1/2012 | Amaitis et al. |
| 2013/0225271 | A1 | 8/2013 | Amaitis |
| 2017/0144073 | A1 | 5/2017 | Amaitis et al. |

OTHER PUBLICATIONS

U.S. Appl. No. 61/602,849, filed Feb. 24, 2012, Amaitis.

Pedregoso Rios, "Where the SLPL Likes to Keep 'Rosters Simple by Allowing Team Owners to Share Players,'" League News, accessed at: http://www.santa-lechuga.com/, dated Sep. 13, 2009 (2 pages).

USPTO Office Action for U.S. Appl. No. 12/605,826, dated Oct. 6, 2011 (10 pages).

USPTO Office Action for U.S. Appl. No. 12/605,826, dated May 11, 2012 (14 pages).

USPTO Notice of Panel Decision for U.S. Appl. No. 12/605,826, dated Dec. 17, 2012 (2 pages).

USPTO Office Action for U.S. Appl. No. 13/160,746, dated Aug. 8, 2012, (10 pages).

USPTO Office Action for U.S. Appl. No. 13/160,746, dated Mar. 28, 2013 (11 pages).

USPTO Office Action for U.S. Appl. No 13/160,746, dated Apr. 25, 2013 (2 pages).

Notification of the International Search Report and the Written Opinion for International Application No. PCT/US2013/027259, dated Apr. 26, 2013 (10 pages).

USPTO Notice of Allowance and Fees Due for U.S. Appl. No. 13/160,746, dated Jun. 25, 2013 (13 pages).

USPTO Office Action for U.S. Appl. No. 12/605,826, dated Dec. 17, 2013 (10 pages).

Taiwanese Office Action with English translation for Application No. 102106266, dated Jul. 28, 2015 (17 pages).

USPTO Notice of Allowance and Fees Due for U.S. Appl. No. 13/160,746, dated Apr. 25, 2014 (7 pages).

Chinese Office Action with English translations for Application No. 201380021755.3, dated May 23, 2016 (9 pages).

Taiwanese Notice of Allowance with English translation for Application No. 102106266, dated Apr. 19, 2017 (3 pages).

Canadian Examiners Report for Application No. 2865390, dated Dec. 4, 2018 (6 pages).

\* cited by examiner

AMUSEMENT DEVICES INCLUDING SIMULATED COURT GAMES OR ATHLETIC EVENTS

CROSS REFERENCE TO RELATED APPLICATIONS

This application is a continuation of U.S. patent application Ser. No. 16/202,904 filed on Nov. 28, 2018 which is a continuation of U.S. patent application Ser. No. 15/250,532 filed on Aug. 29, 2016 (now U.S. Pat. No. 10,258,890 issued on Apr. 16, 2019) which is a continuation of U.S. patent application Ser. No. 14/467,643 filed Aug. 25, 2014 (now U.S. Pat. No. 9,427,669 issued on Aug. 30, 2016) which is a continuation of Ser. No. 13/160,746 filed Jun. 15, 2011 (now U.S. Pat. No. 8,814,695 issued on Aug. 26, 2014), which is a continuation in part of U.S. patent application Ser. No. 12/605,826, filed on Oct. 26, 2009 (now U.S. Pat. No. 9,352,220 issued on May 31, 2016). U.S. patent application Ser. No. 13/160,746 filed Jun. 15, 2011 claims priority to U.S. Provisional Patent Application No. 61/479,539, filed on Apr. 27, 2011 which are hereby incorporated herein by reference.

FIELD

Some embodiments may relate to simulated sport events, games based on actions of players in live sport events, other types of events, and/or other types of games.

BACKGROUND

Wagering may include placing a bet that one event will or will not happen. Fantasy sports may include one or more games related to events taking place in real sports games.

SUMMARY

Figure 1:
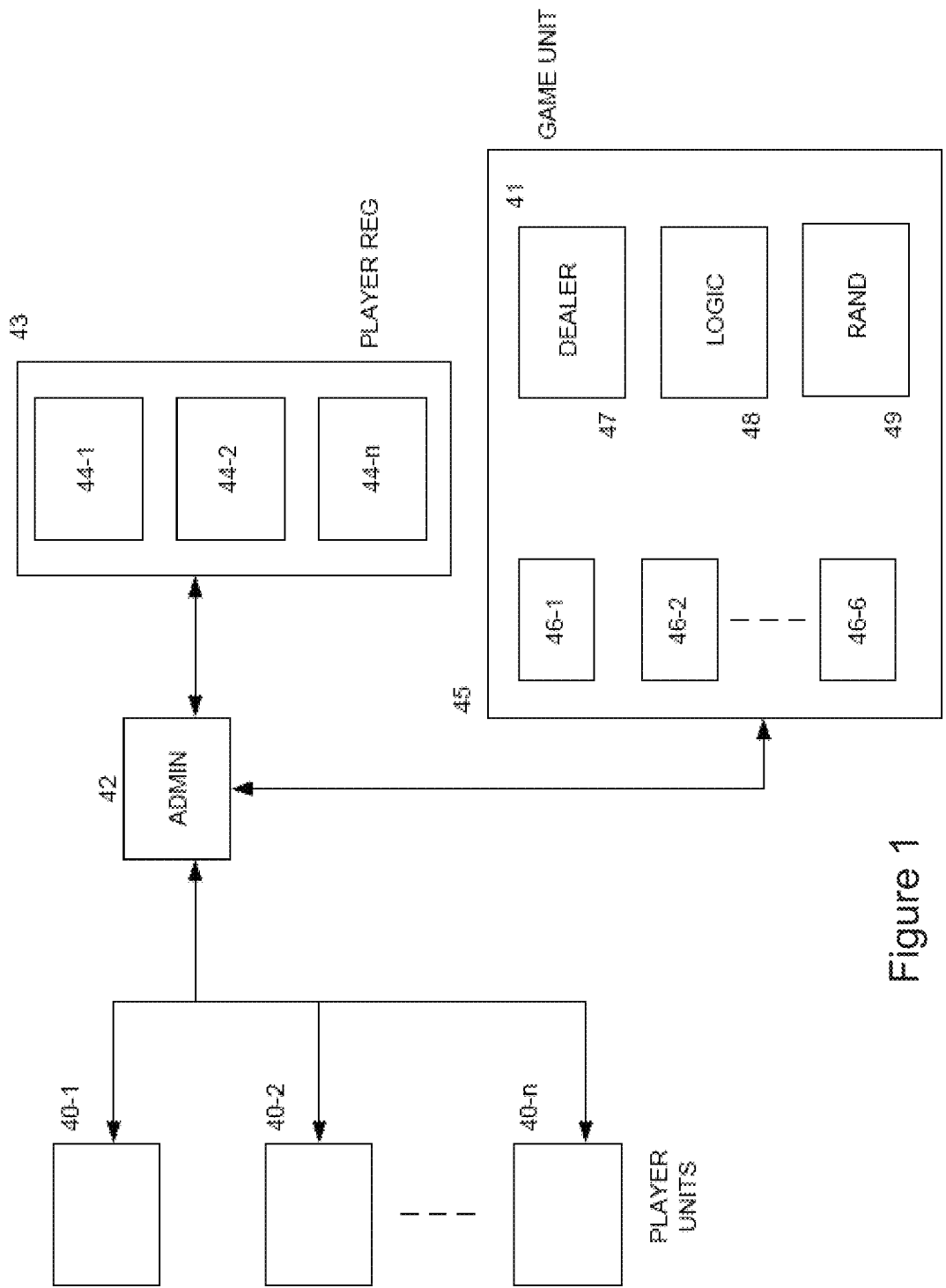
FIG. 1 shows an apparatus for playing a game, according to some embodiments.

The following should be understood to be embodiments, not claims.

An apparatus comprising: a processor configured to execute a plurality of instructions; and a memory on which the plurality of instructions are stored, in which the instructions, when execute, cause the processor to: receive an indication of a first fantasy team for a sport, in which the first fantasy team includes a first plurality of members that each correspond to a respective player of the sport, and in which at least two of the first plurality of members correspond to a same first player of the sport; receive an indication of a second fantasy team for the sport, in which the second fantasy team includes a second plurality of members that each correspond to a respective player of the sport; receive an indication of respective statistics related to each of the corresponding players of the sport; determine, based on the respective statistics, the first fantasy team, and the second fantasy team, a payout ratio for a wager involving the first fantasy team and the second fantasy team; receive an indication of a wager involving the first fantasy team and the second fantasy team; determine an outcome of the wager; and transmit an indication of a payout amount based on the outcome of the wager and the payout ratio.

A.1. The apparatus of claim A, in which at least one of the second plurality of members corresponds to the same first player of the sport. A.2. The apparatus of claim A, in which the statistic includes a statistic related to past performance of the players in the sport. A.3. The apparatus of claim A, in which determining the payout ratio includes determining an expected performance value for the first team, determining an expected performance value for the second team, and determining the payout ratio based on the two values. A.3.1. The apparatus of claim A.3, in which an expected performance value includes a numerical indicator of expected performance based upon statistics of players on a team. A.4. The apparatus of claim A, in which the wager includes a wager that a first fantasy team will outperform a second fantasy team over a period of time A.5. The apparatus of claim A, in which determining the outcome of the wager includes determining the outcome based on events in one or more games involving the players. A.5.1. The apparatus of claim A.5, in which the instructions, when executed, further cause the processor to receive an indication of performance of the one or more players in the one or more games. A.6. The apparatus of claim A, in which transmitting the indication of the payout includes at least one or making the payment, and displaying the payment in a display.

B. An apparatus comprising: a processor configured to execute a plurality of instructions; and a memory on which the plurality of instructions are stored, in which the instructions, when execute, cause the processor to: receive an indication of a first fantasy team for a sport, in which the first fantasy team includes a first plurality of members that each correspond to a respective player of the sport, and in which at least two of the first plurality of members correspond to a same first player of the sport; receive an indication of respective statistics related to each of the corresponding players of the sport; determine, based on the respective statistics, and the first fantasy team, an expected performance value for the first fantasy team; transmit an indication of an available wager involving the first fantasy team and an indication of the expected performance value; receive a plurality of bids to enter into the available wager, in which each bid includes a respective second fantasy team for the sport; form a wager involving the first fantasy team and one second fantasy team; determine an outcome of the wager; and transmit an indication of a payout amount based on the outcome.

B.1. The apparatus of claim B, in which the plurality of instructions, when executed, further cause the processor to: provide an indication of the bids to a submitter of the first team and receive an indication of a selection of the one second team by the submitter. B.2. The apparatus of claim B, in which the plurality of instructions, when executed, further cause the processor to: determine a payout ratio for the wager based on the expected performance value of the first team and a second expected performance value of the second team. B.2.1. The apparatus of claim B, in which each bid includes a respective second expected performance value for a respective second team. B.2.2. The apparatus of claim B, in which the plurality of instructions, when executed, further cause the processor to: determine the second expected performance values based on statistics related to the second team. B.3. The apparatus of claim B, in which each bid includes an indication of a respective payout ratio. B.3.1. The apparatus of claim B.3, in which the plurality of instructions, when executed, further cause the processor to: determine the one second team based on a comparison of the respective payout ratio with the first expected performance value and a second expected performance value associated with the one second team. B.3.1.1. The apparatus of claim B.3.1, in which determining the one second team includes determining the one second team such that the comparison shows that the respective payout ratio is greater than a ratio of the first expected performance value to the second expected performance ratio. B.4. The apparatus of claim B, in which an amount of the wager is included in the bid.

B.5. The apparatus of claim B, in which at least one or the second plurality of members corresponds to the same first player of the sport. B.6. The apparatus of claim B, in which the statistic includes a statistic related to past performance of the players in the sport. B.7. The apparatus of claim B, in which an expected performance value include a numerical indicator of expected performance based upon statistics of players on a team. B.8. The apparatus of claim B, in which the wager includes a wager that a first fantasy team will outperform a second fantasy team over a period of time. B.9. The apparatus of claim B, in which determining the outcome of the wager includes determining the outcome based on events in one or more games involving the players. B.9.1. The apparatus of claim B.9, in which the plurality of instructions, when executed, further cause the processor to: receive an indication of performance of the one or more players in the one or more games. B.10. The apparatus of claim B, in which transmitting the indication of the payout includes at least one or making the payment, and displaying the payment in a display.

C. An apparatus comprising: a processor configured to execute a plurality of instructions; and a memory on which the plurality of instructions are stored, in which the instructions, when execute, cause the processor to: determine a first fantasy team for a sport, in which the first fantasy team includes a first plurality of members that each correspond to a respective player of the sport; receive from a player an indication of a second fantasy team for the sport, in which the second fantasy team includes a second plurality of members that each correspond to a respective player of the sport; receive an indication of respective statistics related to each of the corresponding players of the sport; determine, based on the respective statistics, and the first fantasy team, a first performance expectation of the first team in a fantasy game; determine, based on the respective statistics, and the second fantasy team, a second performance expectation of the second team in the fantasy game; determine a characteristic for a wager on the second fantasy team to win the fantasy game between the first fantasy team and the second fantasy team based on the first performance expectation and the second performance expectation; presenting the characteristic to the player; receive an indication of a wager of an amount of money that the second fantasy team will win the fantasy game, in which the wager is defined by the characteristic; determine an outcome of the wager; and transmit an indication of a payout amount based on the outcome of the wager and the amount of money.

C.1. The apparatus of claim C, in which at least one of the second plurality of members corresponds to one of the first plurality of members. C.2. The apparatus of claim C, in which the statistic includes a statistic related to past performance of the players in the sport. C.3. The apparatus of claim C, in which an expected performance value includes a numerical indicator of expected performance based upon statistics of players on a team. C.4. The apparatus of claim C, in which the wager includes a wager that a second fantasy team will outperform a first fantasy team over a period of time. C.5. The apparatus of claim C, in which determining the outcome of the wager includes determining the outcome based on events in one or more games involving the players. C.5.1. The apparatus of claim C.5, in which the instructions, when executed, further cause the processor to receive an indication of performance of the one or more players in the one or more games. C.6. The apparatus of claim C, in which transmitting the indication of the payout includes at least one or making the payment, and displaying the payment in a display. C.7. The apparatus of claim C, in which the characteristic includes a handicap. C.8. The apparatus of claim C, in which the performance expectation includes an amount of points. C.9. The apparatus of claim C, in which the first fantasy team is determined based on a received indication of the first fantasy team, and in which the indication of the first fantasy team and the second fantasy team are received from the first player.

D. An apparatus comprising: a processor configured to execute a plurality of instructions; and a memory on which the plurality of instructions are stored, in which the instructions, when execute, cause the processor to: receive an indication of a first fantasy team for a sport, in which the first fantasy team includes a first plurality of members that each correspond to a respective player of the sport, receive an indication of respective statistics related to each of the corresponding players of the sport; determine, based on the respective statistics, and the first fantasy team, an expected performance value for the first fantasy team; transmit an indication of an available wager involving the first fantasy team and an indication of the expected performance value; receive a plurality of second fantasy teams from a plurality of second players, in which each respective fantasy team includes a respective set of players; receive an indication of respective statistics related to each of the respective players of the sport; determine a respective second expected performance value for each of the second fantasy teams; determine respective characteristics for respective wagers involving the first fantasy team and each of the respective second fantasy teams; accepting respective wagers each defined by a respective characteristic and involving the first fantasy team and a respective second fantasy team; determine outcomes of the wagers; and transmit indications of payouts based on the outcomes.

D.1. The apparatus of claim D, in which the characteristics include respective handicaps. D.2. The apparatus of claim D, in which at least one member of respective sets of players corresponds to the same first player of the sport. D.3. The apparatus of claim D, in which the statistics includes a statistic related to past performance of the players in the sport. D.4. The apparatus of claim D, in which an expected performance value include a numerical indicator of expected performance based upon statistics of players on a team. D.5. The apparatus of claim D, in which expected performance values include expected points that will be earned in a fantasy game on which the wagers are based. D.6. The apparatus of claim D, in which the wagers includes respective wagers that a respective second fantasy team will outperform the first fantasy team over a period of time in view of the characteristic. D.7. The apparatus of claim D, in which determining the outcomes of the wagers includes determining the outcome based on events in one or more games involving the players. D.7.1. The apparatus of claim D.7, in which the plurality of instructions, when executed, further cause the processor to: receive an indication of performance of the one or more players in the one or more games. D.8. The apparatus of claim D, in which transmitting the indication of the payouts includes at least one or making the payments, and displaying the payments in a display.

DETAILED DESCRIPTION

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s)

may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth□, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Cards

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards. Other types of playing cards are described herein, but it should be recognized that various topics may apply to any, some, and/or all type of playing cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XII. Rules of Card Games

Rules of Poker

In a basic poker game, which is played with a standard 52-card deck, each player is dealt five cards. All five cards in each player's hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player's hand. Regardless of the number of cards in a player's hand, the values assigned to the cards, and the odds, the method of evaluating all five cards in a player's hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a 'dealer' button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players' hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker

Players each receive five—as in five-card draw—or more cards, all of which are hidden. They can then replace one or more of these cards a certain number of times.

Stud Poker

Players receive cards one at a time, some being displayed to other players at the table. The key difference between stud and 'draw' poker is that players are not allowed to discard or replace any cards.

Community Card Poker

Players combine individually dealt cards with a number of "community cards" dealt face up and shared by all players. Two or four individual cards may be dealt in the most popular variations, Texas hold 'em and Omaha hold 'em, respectively.

Poker Hand Rankings

Straight Flush

A straight flush is a poker hand such as Q♣J♠10♠9♠8♠, which contains five cards in sequence, all of the same suit. Two such hands are compared by their high card in the same way as are straights. The low ace rule also applies: 5♦4♦3♦2♦A♦ is a 5-high straight flush (also known as a "steel wheel"). An ace-high straight flush such as A♣K♣Q♣J♣10♣ is known as a royal flush, and is the highest ranking standard poker hand (excluding five of a kind).

Examples

7♥6♥5♥4♥3♥ beats 5♠4♠3♠2♠A♠
J♣10♣9♣8♣7♣ ties J♦10♦9♦8♦7♦
Four of a Kind

Four of a kind, or quads, is a poker hand such as 9♣9♠9♦9♥J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Examples

10♣10♦10♥10♠5♦ ("four tens" or "quad tens") defeats 6♣6♥6♠6♣K♠ ("four sixes" or "quad sixes")
10♣10♦10♥10♠Q♣ ("four tens, queen kicker") defeats 10♣10♦10♥10♠5♦ ("four tens with a five")
Full House A full house, also known as a boat or a full boat, is a poker hand such as 3♣3♠3♦6♣6♥, which contains three matching cards of one rank, plus two matching cards of another rank. It ranks below a four of a kind and above a flush. Between two full houses, the one with the higher ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

Examples

10♣10♥10♦4♣4♦ ("tens full") defeats 9♥9♣9♠A♥A♣ ("nines full")
K♠K♣K♥3♣3♠ ("kings full") defeats 3♠3♥3♦K♠K♦ ("threes full")
Q♥Q♣Q♣8♥8♣ ("queens full of eights") defeats Q♥Q♦Q♣5♣5♥ ("queens full of fives")
Flush A flush is a poker hand such as Q♣10♣7♣6♣4♣, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in "queen-high flush".

Examples

A♥Q♥10♥5♥3♥ ("ace-high flush") defeats K♠Q♠J♠9♠6♠ ("king-high flush")
A♦K♦7♦6♦2♦ ("flush, ace-king high") defeats A♥Q♥10♥5♥3♥ ("flush, ace-queen high")

Q♥10♥9♥5♥2♥ ("heart flush") ties Q♠10♠9♠5♠2♠ ("spade flush")
Straight

A straight is a poker hand such as Q♣J♠10♠9♥8♥, which contains five cards of sequential rank, of varying suits. It ranks above three of a kind and below a flush. Two straights are ranked by comparing the high card of each. Two straights with the same high card are of equal value, and split any winnings (straights are the most commonly tied hands in poker, especially in community card games). Straights are described by the highest card, as in "queen-high straight" or "straight to the queen".

A hand such as A♣K♣Q♦J♣10♠ is an ace-high straight, and ranks above a king-high straight such as K♥Q♠J♥10♥9♦. But the ace may also be played as a 1-spot in a hand such as 5♣4♦3♦2♦A♣, called a wheel or five-high straight, which ranks below the six-high straight 6♠5♠4♣3♦2♥. The ace may not "wrap around", or play both high and low in the same hand: 3♣2♦A♠K♠Q♣ is not a straight, but just ace-high no pair.

Examples

8♠7♠6♥5♥4♠ ("eight-high straight") defeats 6♦5♠4♦3♥2♠ ("six-high straight")
8♠7♠6♥5♥4♠ ties 8♥7♦6♠5♠4♥
Three of a Kind Three of a kind, also called trips, set or a prile, is a poker hand such as 2♦2♠2♥K♠6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

Examples

8♠8♥8♦5♠3♣ ("three eights") defeats 5♣5♥5♦Q♦10♣ ("three fives")
8♠8♥8♦A♠2♦ ("three eights, ace kicker") defeats 8♠8♥8♦54♣3♣ ("three eights, five kicker")
Two Pair A poker hand such as J♥J♣4♣4♠9♣, which contains two cards of the same rank, plus two cards of another rank (that match each other but not the first pair), plus one unmatched card, is called two pair. It ranks above one pair and below three of a kind. Between two hands containing two pair, the higher ranking pair of each is first compared, and the higher pair wins. If both have the same top pair, then the second pair of each is compared. Finally, if both hands have the same two pairs, the kicker determines the winner. Two pair are described by the higher pair (e.g., K♥K♠) and the lower pair (e.g., 9♠9♦), as in "Kings over nines", "Kings and nines" or simply "Kings up".

Examples

K♥K♦2♣2♦J♥ ("kings up") defeats J♦J♠10♠10♣9♠ ("jacks up")
9♣9♦7♦7♠6♥ ("nines and sevens") defeats 9♥9♠5♥5♦K♣ ("nines and fives")
4♠4♣3♠3♥K♦ ("fours and threes, king kicker") defeats 4♥4♦3♣3 10♠ ("fours and threes with a ten")
One Pair One pair is a poker hand such as 4♥4♠K♠10♦5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

Examples

10♣10♠6♠4♥2♥ ("pair of tens") defeats 9♥9♣A♥Q♦10♦ ("pair of nines")
10♥10♦J♦3♥♣ ("tens with jack kicker") defeats 10♣10♠6♠4♥2♥ ("tens with six kicker")
2♦2♥8♠5♠4♣ ("deuces, eight-five-four") defeats 2♣2♠8♣5♥3♥ ("deuces, eight-five-three")

High Card

A high-card or no-pair hand is a poker hand such as K♥J♠8♠7♦3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest ranking card; if those are equal, then the next highest ranking card; if those are equal, then the third highest ranking card, etc. No-pair hands are described by the one or two highest cards in the hand, such as "king high" or "ace-queen high", or by as many cards as are necessary to break a tie.

Examples

A♦10♦9♠5♠4♣ ("ace high") defeats K♣Q♦J♣8♥7♥ ("king high")
A♣Q♣7♦5♥2♣ ("ace-queen") defeats A♦10♦9♠5♠4♣ ("ace-ten")
7♦6♣5♠4♦2♥ ("seven-six-five-four") defeats 7♣6♦5♦3♥2♣ ("seven-six-five-three")

Decks Using a Bug

The use of joker as a bug creates a slight variation of game play. When a joker is introduced in standard poker games it functions as a fifth ace, or can be used as a flush or straight card (though it can be used as a wild card too). Normally casino draw poker variants use a joker, and thus the best possible hand is five of a kind, as in A♥A♦A♣A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that must qualify. As the dealer's hand is partially concealed during play (usually only one card, at most) is displayed to the player before player wagering is complete), the player must always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the wager, take precisely one more card and then "stand." When a player has identical value cards, such as a pair of 8s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer must hit until he has a point total of at least 17, regardless of what the players have. In most casinos, the dealer must also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural' (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

XIII. Casino Countermeasures

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XIV. Video Wagering Games

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

XV. Apparatus for Playing Over a Communications System

FIG. 1 shows apparatus for playing the game. There is a plurality of player units 40-1 to 40-*n* which are coupled via a communication system 41, such as the Internet, with a game playing system comprising an administration unit 42, a player register 43, and a game unit 45. Each unit 40 is typically a personal computer with a display unit and control means (a keyboard and a mouse).

When a player logs on to the game playing system, their unit 40 identifies itself to the administration unit. The system holds the details of the players in the register 43, which contains separate player register units 44-1 to 44-*n* for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40, and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

XVI. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XVII. References

The following patents and patent applications are hereby incorporated by reference herein for all purposes: U.S. Pat. Nos. 6,579,181, 6,299,536, 6,093,103, 5,941,769, 7,114,718, U.S. patent application Ser. No. 10/622,321, U.S. Pat. Nos. 4,515,367, 5,000,453, 7,137,630, and 7,137,629.

XVIII. Example Embodiments

Some embodiments may relate to fantasy events and/or wagering related to fantasy events. Various examples are given in relation to a popular variation of fantasy events, namely fantasy sports, but it should be understood that various embodiments may include any fantasy event. In some embodiments, fantasy sports may provide a manner for a participant to act in a role similar to a coach and/or general manager. In some embodiments, a participant may be given the ability to draft, create, trade, dismiss and/or otherwise manage a fantasy team.

A team should be understood to include a club (e.g., soccer club), an individual in a one or more sport, one or more individuals in one or more events, and/or other variations of similar concepts. A fantasy team for an activity may include one or more members that each correspond to one or more respective real and/or active participants in the activity. For example, a fantasy team for a sport may include one or more players of the sport. The players may include active players in a real league for the sport. The players may include active league players from one or more real sports league.

The events, participants, and/or players to which a fantasy event may be related may include any desired events, participants, and/or players. For example, some events may include political events (e.g., elections), sporting events (e.g., football, baseball, basketball, hockey, soccer, rugby, golf, tennis, automotive racing, animal racing), competitions (poker, test taking, rock throwing, tree growing), other events, and so on. For example, some participants and/or players may include politicians, human players, animal participants, robots, natural phenomena, plants, physical things, and so on. It should be recognized that fantasy event competitions may be constructed based on any kind of activity. For example, fantasy competitions may be constructed based on an activity in which participants in the fantasy competition may compete vicariously based upon observations or statistics regarding some underlying activity (e.g., wind speed, elections, tree growth, baseball, and so on).

In some embodiments, a participant in a fantasy sports game may select members to form a fantasy team for a sport. In some embodiments, a participant may select or "draft", currently active real-life players to form a fantasy team. Accordingly, a fantasy team for a sport may include a plurality of members that each correspond to a respective player of the sport. In some embodiments, a member of a fantasy team may include a group of players (e.g., the defense of a particular football team may be a member of a fantasy team, the outfield of a particular baseball team may be a member of a fantasy team, and so on).

In some embodiments a plurality of participants may form a fantasy league and draft players in the fantasy league and/or may form individual fantasy teams irrespective of a league. As an example, in a fantasy football league, a plurality of league participants may each draft professional football players onto their fantasy team for respective positions (e.g., quarterback, running back, wide receiver, tight end, kicker, defense, reserve players, etc.) and/or no position depending, for example, on rules of a game and/or league. A manner of drafting players into a fantasy team may mimic a manner in which professional sports leagues conduct drafts. Some embodiments may include a dynasty-type drafting scheme in which participants maintain a predetermined amount of their team players over the course of a few seasons, and may further draft new players. Some embodiments may include an auction-type drafting scheme in which participants are allocated a certain monetary value, in which each professional player eligible for selection by a participant is assigned a salary, and in which the participants may select players up to the allocated monetary value. In some embodiments, values of a player may change through a game (e.g., through a season), and a participant desiring to trade or otherwise acquire a player at a later point in a game may "pay" a different amount than at a beginning of a game.

In some embodiments, a number and/or assortment of players on a fantasy team may be limited by other league participants, by an agreed upon central authority, by a computer system hosting the game, by a casino, house and/or sports book hosting the game, and/or by any other manner. In some embodiments in which the certain monetary value is allocated to participants, the participants may allocate the provided money towards player selection in any desired manner that may be allowed by such established league rules.

A fantasy sports league may be formed by friends, acquaintances, strangers, and so on at a casino, through a web site, and so on. In some embodiments, a league may have rules regarding a uniqueness of a player. For example in some embodiments, a player may only be part of one fantasy team in a fantasy league, may only appear a maximum of one time in any one fantasy team of a fantasy league, but may appear on multiple teams, may appear any maximum number or no maximum number of times on a fantasy team, may appear any number of times in a position played by the player in actual games, may appear any number of times in a particular position, and so on. In some embodiments, teams in a league may include a maximum number of common players (e.g., no team may share more than one member).

Although an example above describes an auction-type system in which participants have a budget for players, other embodiments may not include such a budget and may allow any selection of any players according to any rules or no rules. Some embodiments may not include a league. For example, in some embodiments, one participant may form a fantasy team, and a second participant (e.g., a casino or other venue, another player) may form a second fantasy team. The participants may enter into a fantasy sports game against one another (e.g., over one game, over a season, etc.). The participants may not be part of a separate fantasy league and/or may be considered to be a fantasy league of their own. The participants may play the fantasy game through a casino, sports book, web site, and so on. Rules regarding team formation, player selection, player uniqueness, and so on may be established by a venue of the fantasy game.

Some embodiments may not include a league of players and/or a draft. Some embodiments may include individual players that may select members of a team. Such selection may be based on one or more rules. For example, in some embodiments, a number of each of a quarterback, a tight end, a kicker, and so on may be required to be selected. In some embodiments, such member may be unique so that each team and/or each matchup of teams may only include one of each member. In other embodiments, each member may not be unique. In some embodiments, each team in a matchup may only include a maximum number of common members. In some embodiments, a player may be presented with available players to add to a team. Available players may include payers that have not been selected for a casino team and/or that have not been selected for all casino teams, players that have not been added more than a maximum number of times to one or more other teams and so on in various embodiments as desired. For example, a determination may be made that player Y has been included in one or more teams (e.g., a casino team against which a player has selected to enter into a match with), so that when available players are presented, player Y may not be available to be added to a player team. In some embodiments, an interface through which a player may select players may be controlled such that such player Y may be excluded from the interface based on the player having been selected for one or more teams.

In some embodiments, a member of a team may include a portion of a real team. For example, in some embodiments, in addition to and/or as an alternative to a particular member of a team being selected for a fantasy team, a portion of a team may be selected for a fantasy team. For example, a defensive team of a football team may be selected for a fantasy team regardless of actual members of the defensive team. Accordingly, scoring of such a fantasy team may relate to actions and/or performance of the entire defensive team rather than a single member of the team.

In some embodiments, a participant may take various actions during a fantasy game (e.g., though out a season, between individual real games, week-to-week, before a game starts, at halftime). Such actions may include selecting active and/or reserve players, making trades, cut players, hire players, assigning players to particular positions, and/or otherwise maintaining the composition of a fantasy team roster. It will be understood that any desired decision-making capability may be given to a participant. In some embodiments, if a player does not participate in an actual sporting event (e.g., injured, traded, released, etc.), the participant must adjust the fantasy team roster accordingly. In some embodiments, such an adjustment may affect odds or other parameters of a bet. In some embodiments, a change to a team made by a player and/or otherwise (e.g., an injury occurring in real life causing a player to not participate in a game) may result in a cancellation of a wager.

In some embodiments, a central authority may establish and/or enforce rules for a fantasy sports game. Such a central authority may include a casino, a server, a house, a book maker, a web site, and so on. Such a central authority may be referred to as a commissioner, and/or a treasurer. In some embodiments, multiple entities may operate as separate parts of such a central authority (e.g., one treasurer and one commissioner). In some embodiments, the central authority may be configured to determine outcomes of a game, accept wagers, determine odds, accept money, maintain accounts, pay winnings, and so on. A central authority may include one or more computing devices (e.g., servers, processors, mobile devices, and so on) configured to perform one or more actions in order to facilitate gaming.

In some embodiments, outcomes of a game of a fantasy sport may be based on performance statistics related to the sport. For example, one or more Major League Baseball games may be a source of such performance statistics. As another example, game logs from NFL.com may be a source of such performance statistics (e.g., a central authority may access the game logs through a communication network and analyze events in the logs to assign points to one or more fantasy teams). Any number and/or combination of sources may be used. In some embodiments, an outcome related to a participant associated with a first fantasy team may be based on actual performance of the active players that are members of the fantasy team in real life games. A participant's success or failure in a game may correspond to the performance of the active real-life players in one or more real-life games. In some embodiments, the performance of all and/or some members of two or more fantasy teams in real life may be used collectively to determine an outcome of a game involving the two or more fantasy teams and/or points to award to one or more fantasy teams.

In some embodiments, a central authority may compile and/or access statistics related to events in the sport. Such statistics may include, for example, a number of points scored by each player, a number of bases stolen, a number of yards run, a number of passes completed, a finishing position, a number of assists, a number of interceptions, a number of blocks, and so on.

In some embodiments, an outcome of a fantasy sports game may be based on the statistics and/or one or more events in one or more games. For example, in some embodiments, a participant may be awarded a number of points for each goal scored in a soccer game if the player that scored the goal in real life corresponds to a member of the participant's fantasy team. Any action may correspond to any number of points to any one or more participants in any direction (e.g., a block by a member of a first fantasy team may subtract one point from a participant associated with a second fantasy team). In some embodiments, events in real life may have different influence on a fantasy game based on a position of a real life player on a real life team and/or a position of a player in a fantasy team. For example, in some embodiments, scoring and/or offensive action by real life players may affect an outcome of a fantasy game if one or more real life player responsible for a scoring and/or offensive action is assigned to an offensive position in a fantasy team. For example, defensive actions may affect an outcome of a fantasy game if one or more real life players responsible for the defensive action is assigned to a defensive position in a fantasy team. For example, in such an embodiment, a completed pass by a quarterback in real life may affect an outcome of a fantasy game if the quarterback is assigned to the quarterback position in the fantasy team, but may not affect the outcome if the quarterback is instead assigned to a running back, other offensive or defensive position and/or other non-quarterback position. In some embodiments, a position of a player on a real life team and/or a position of a player on a fantasy team may have no such effect on an outcome.

It should be recognized that any desired method of determining an outcome based on performance may be used in various embodiments. In some embodiments, such method may be simple and/or complex models of games.

In some embodiments, a system may be configured to provide one or more participants with fantasy sports contest-related information. Fantasy sports contest-related information may include any suitable information associated with one or more fantasy sports contests. For example, fantasy sports contest-related information may include information regarding a participant's one or more rosters, a participant's standing in one or more fantasy sports contests, point tallies associated with a participant in one or more fantasy sports contests, information regarding the number of trades that a participant may make, information regarding the amount of fantasy money available to a participant for contracting players for a roster, information regarding deadlines to make trades or to perform any other suitable task associated with one or more fantasy sports contests, an outcome of a fantasy game and/or any other suitable information.

In some embodiments, a system may be configured to provide one or more participants with information regarding one or more real life games. Such information may include information regarding real-life athletes (e.g., names, statistics, etc.), real-life sports leagues (e.g., game schedules, standings, etc.), real-life sporting events (e.g., baseball games, golf tournaments, tennis matches, etc.), sports arenas, weather information, sports commentary, or any other suitable information regarding real-life sports or events.

In some embodiments, various types of fantasy games may be played. For example, a head-to-head type game may be played in some embodiments. A head-to-head game may include a participant competing against one or more participant (e.g., another player, a casino or other gaming operator) in a game (e.g., over a week, over a season and so on). In some embodiments, the fantasy team that accumulates the most points in the game period based on performance in actual games may win the game. As another example, a "rotisserie league" game may be played in some embodiments. In such a game, participants associated with respective fantasy teams compile won-lost records by competing head to head against each of the other teams in the league. A winner in such a system may be determined based on the performance of active real life athletes in real life games. It should be recognized that any desired game type and/or scoring system may be used in various embodiments.

In some embodiments, a playoff type game may be played. For example, participants may play one or more games during a regular season of fantasy games that may or may not correspond to a regular season of an underlying sport. Participants may be eliminated during the regular season in some embodiments. Participants may acquire points and/or wins during the regular season. Participants remaining at some point in the game, with a most number of points and/or wins at some point in the game may qualify for a playoff type game. The playoff game may be similar and/or different to a "regular season" game. For example, a participant may be able to select members for their playoff team and engage in games in the playoffs with the selected fantasy team. A winning of the playoff may be larger than a winning of a regular season. Players that may be selected may be limited to those players that are participating in a playoff in an underlying game. Different rules regarding budgets, uniqueness, and/or scoring may be used in a playoff game.

Some embodiments may include a pari-mutuel pool for a league. For example, each player that enters a team into a league may pay wager amount. The winner of the league may win at least a portion of the pool of wagers.

In some embodiments, a game may include a game against a casino team. For example, a house may establish one or more fantasy teams made up of members of one or more actual teams. A player may establish one or more fantasy teams made up of members of one or more actual teams. The player's fantasy team may compete against the house's fantasy team in one or more games (e.g., a football week, a football season, a four game stretch, and so on). A player may enter a wager that the player team will win and/or that the casino team will win a particular matchup.

In some embodiments, participants may wager on the outcomes of one or more games. In some embodiments, a fee to enter into a league may be charged and the winner(s) of the league may be assigned desired portions of the fees. In some embodiments, a player may identify an amount of a wager and another player may agree to that amount. The winner of such a game may win the entire wagered amount.

It should be recognized that a fantasy sports game need not be limited or restricted in time. For example, a fantasy sports contest may last an entire season, a portion of the season, a definite period of time (e.g., one month, two weeks, three days, one hour, etc.), the duration of a particular event (e.g., Wimbledon, etc.), a portion of a particular event, or any other suitable period of time.

In some embodiments, a fantasy sports contests may include event wager options. For example, fantasy sports contests may involve a participant wagering on whether particular outcomes will occur (e.g., whether a particular golfer will make the next put). Such wagers may be placed against a house, another participant (e.g., a participant against whom a team to team wager is placed, and so on).

Some embodiments may include wagering against a house and/or wagering against another one or more players. For example, in some embodiments, a player may submit a fantasy team to play a game against a casino's own fantasy team. A player may select a particular fantasy team of a casino from among a plurality that a casino may offer in some embodiments (e.g., a casino may identify one or more teams that they have created for a player to select to play against). In some embodiments, a player may create a team for a casino and a team for the player and submit both teams for a wager (e.g., a player may desire their team to play against a particular other team that they also select). A player may place a wager that one or more such teams (casino teams, and/or player teams) may win and/or may lose.

For example, some embodiments may include displaying a set of fantasy teams that may be wagered against through an interface to a player. Such fantasy teams may be formed by a casino to allow other players to wager against. The player may use such an interface to select a fantasy team to place a wager against. The interface may identify information about an expected performance of each of the teams. For example, the interface may identify an expected number of points that each team is expected to earn in a coming game. The interface may identify an amount of money that has been wagered on and/or against each team and/or all teams (e.g., amount of money in a pari-mutuel pool). It should be recognized that any team may be wagered against and or wagered on (e.g., for) in any combination in various embodiments.

Some embodiments may include presenting an interface through which a player may form a team for such a wager. Such an interface may allow a player to select members of the team from a set of players of a real sport (e.g., players that are expected to play in an upcoming game). Such an interface may present information about each possible member to add to a team to allow a player to better perform a selection of members. For example, an interface may display an expected number of points that each possible addition to a team may be expected to score in a game. Such an interface may identify if one or more possible members has been chosen as part of a casino team and/or other team (e.g., that may eliminate the selection by a player for a wager against that particular team in some embodiments). Such members may be excluded from an interface in some embodiments if rules of such an embodiment prevent the member form being added to a team for some reason (e.g., the member is in another team, there are already a number of common members to teams and addition of a member would exceed a maximum threshold of common members, a member is expected to be injured, and so on) Such an interface may identify a number of times a member has been selected for a team and/or an amount of money that has been wagered on and/or against teams with a member.

In some embodiments, one or more characteristics for a wager involving a player's team, a casino's team and/or any number of other teams may be determined based on members of each respective team. For example, in some embodiments, odds, moneylines, point spreads, a handicap and/or any desired characteristic may be determined for a wager on one team against another team based on expected performance of members of one team compared to members of another team. Various examples of determining characteristics are given herein.

In some embodiments, such information may be displayed in an interface related to a selection of a team. For example, a handicap may be displayed in an interface for the selection of a team. Such information may identify how a selection of one player or another player has affected or would affect a handicap if added to a team. For example, a handicap may identify a current handicap at a current makeup of a team even if the team is not complete or finalized. As members are added and/or change, the handicap may adjust to reflect the next state of the team.

In some embodiments, a player may form their team and then select a casino team and/or may form and/or select opponent teams in any combination order or manner as desired. An interface may identify a handicap of associated with wagers involving each of the possible casino and/or opponent teams and the selected player team. In some embodiments, one or more teams may not be available for selection in a game against a player team based on rules of a venue (e.g., if a casino team includes more than a number of common members with a player's team, the casino team may be excluded from an interface in response to a determination of such common members).

In some embodiments, in response to a selection of a player's team and/or a opponent's team (e.g., a casino team), such characteristics may be displayed to a player. For example, in response to a formation of a player's team and a selection by that player that the player desires to enter into a wager setting that team against a particular casino team, an indication of a handicap for such a wager may be identified through an interface to the player. The interface may allow the payer to accept, alter, set a bet amount, reject, and so on the wager having the identified characteristic. For example, an interface may identify that a player may enter into the wager with the player's team being required to win by 8.5 points in order to win the wager. A player may be able to wager one either team in such a matchup having such a handicap. The player may enter a dollar amount in response to such an indication to place a wager, press an accept button to accept a wager, reject a wager, and so on as desired.

It should be recognized that while some embodiments may be described in terms of a wager against a casino team and/or a wager against a casino, that other embodiments may include a wager against another player and/or a wager against a team formed by the player and/or another player. Elements of one embodiment may apply to another embodiment in any combination (e.g., an interface that includes information such as handicaps about possible opponent teams may be included in a plurality of embodiments).

In some embodiments one or more characteristics and/or teams may be determined based on an exchange and/or matching of two players. For example, a player may form a team and identify that they desire a wager on or against such a team. The player may present such information to a casino and/or other player. Another player may enter information about an opposing team and submit such information to the casino and/or player. A characteristic of such a wager (e.g., handicap) may be determined (e.g., by a server, by a casino) and presented to one or more of the players. One or more of the players may enter bet amount and/or accept a wager having such a handicap. A wager may be formed between the players and/or between each of the players and the casino.

Some embodiments may include a tournament game. For example, a plurality of players that form a league may compete for a player that wins a most amount of points over time and/or in a particular game. A winner of such a tournament may be presented with a pool of money from all the players.

One example fantasy sports system is described in U.S. Pat. No. 6,371,855 to Gavriloff, which is hereby incorporated herein by reference. Another example fantasy sports system is described in U.S. Pat. No. 7,001,279 to Barber, which is hereby incorporated herein by reference. Yet another example of a fantasy sports system is described in U.S. patent publication number 2008/0287198 to Callery, which is hereby incorporated herein by reference. An example of a fantasy sports system that may include additional interactive elements is described in U.S. Pat. No. 7,351,150 to Sanchez, which is hereby incorporated herein by reference. One variation of a fantasy sports game is given in U.S. patent publication 2005/0064937 to Ballman, which is hereby incorporated herein by reference. An example of a fantasy sports betting system that may provide additional advice to players is described in U.S. patent publication 2007/0060380 to McMonigle, which is hereby incorporated herein by reference. An example commissioner system for a fantasy sports system is described in U.S. patent publication number 2008/0200254 to Cayce, which is hereby incorporated herein by reference. An example system for managing assets and transactions related to a fantasy sports system is described in U.S. patent publication 2008/0215168 to Charchian, which is hereby incorporated herein by reference. An example of pari-mutuel wagering related to fantasy sports is described in U.S. patent publication number 2009/0023495 to Koustas, which is hereby incorporated herein by reference.

It should be understood that the above are merely illustrative elements of fantasy sports contests. Any other suitable arrangement or approach may be used. It will further be understood that the nature of the fantasy sports contests may vary depending on which activity or sport is involved or based on any other suitable criteria.

Figure 2:
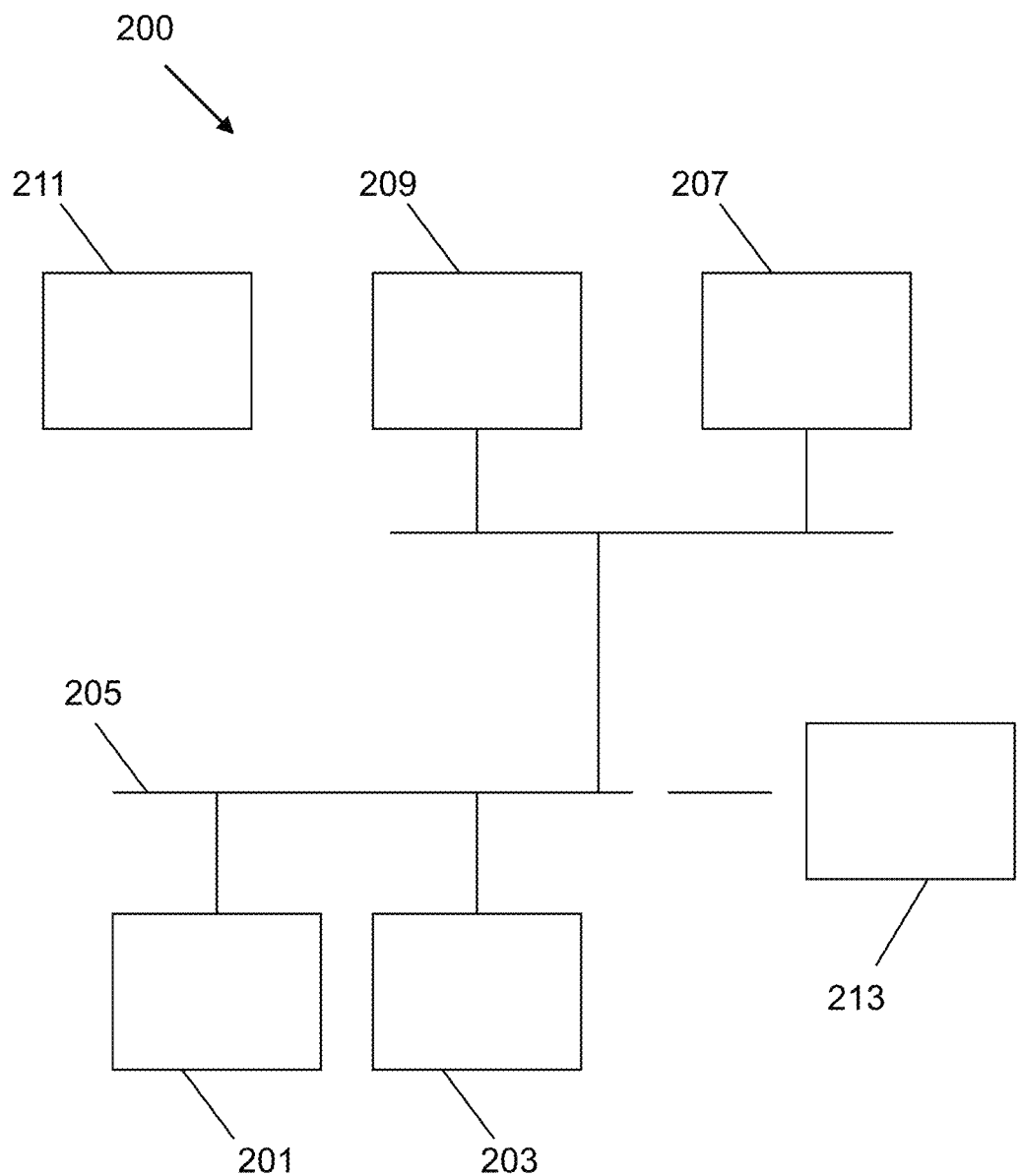
FIG. 2 shows an example fantasy sports system according to some embodiments.

Some embodiments may include a fantasy sports system. One example fantasy sports system 200 is illustrated in FIG. 2. As illustrated, fantasy sports system 200 may include a wager system 201, an event server 203, a network 205, a client computing device 207, a staff computing device 209, a mobile device 211, and an event source 213.

Wager system 201 may be configured to perform any desired services related to a wager. For example, wager server 201 may receive one or more indications of wagers. Wager system 201 may match wager bids together, may form wagers, may audit wagers, may provide outcomes of wagers, may act as treasurer or house for a wager, may provide wagering opportunities, and so on. In some embodiments, wager system 201 may allow a participant to enter into a wager against a house. In some embodiments, wager system 201 may allow a participant to enter into a wager against another participant. It should be recognized that wagering system 201 may include any number of systems, computing devices, and/or any desired components.

Figure 5:
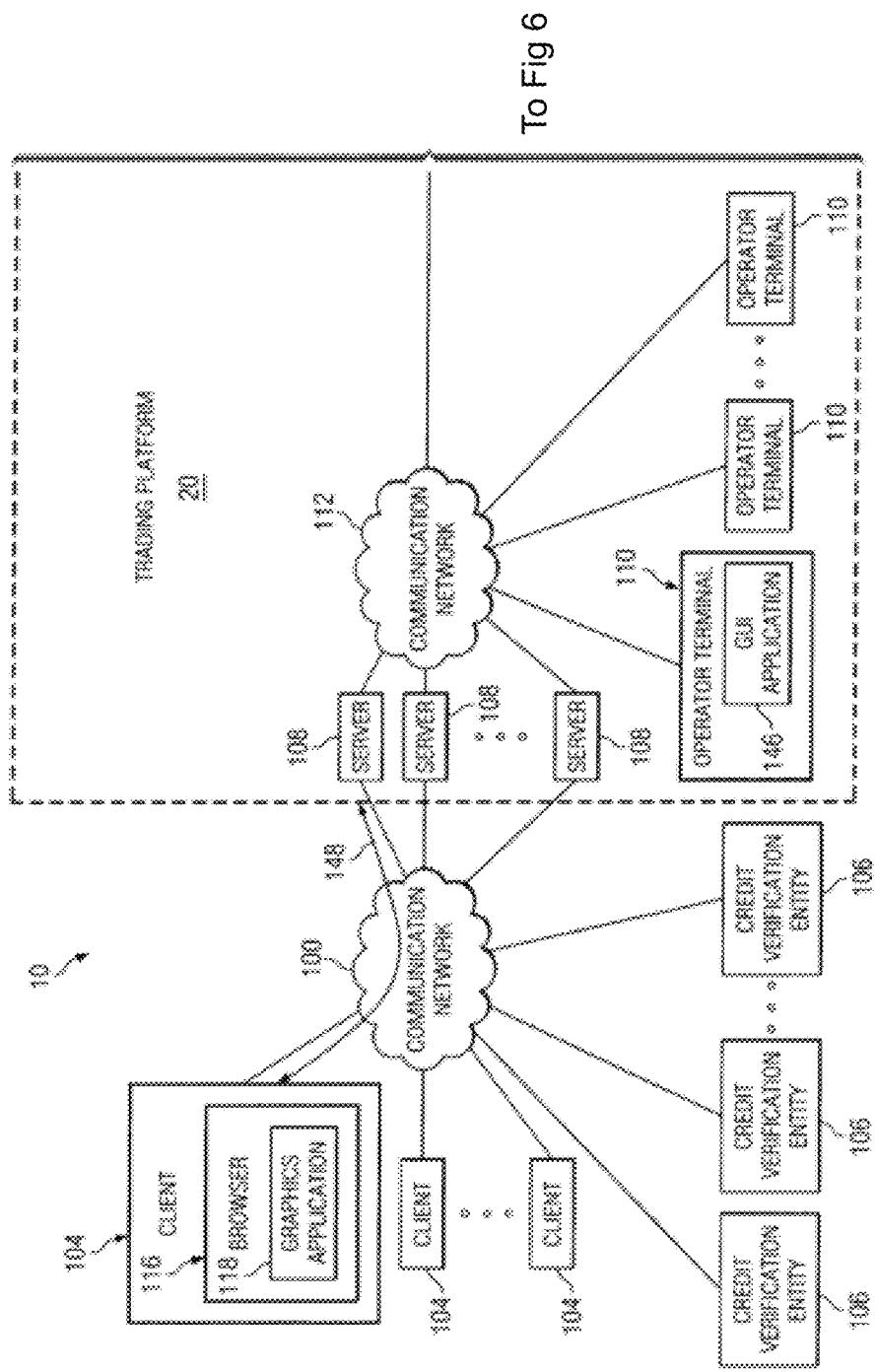
FIGS. 5, 6, and 7 show example wagering systems that may be included in some embodiments.
Figure 6:
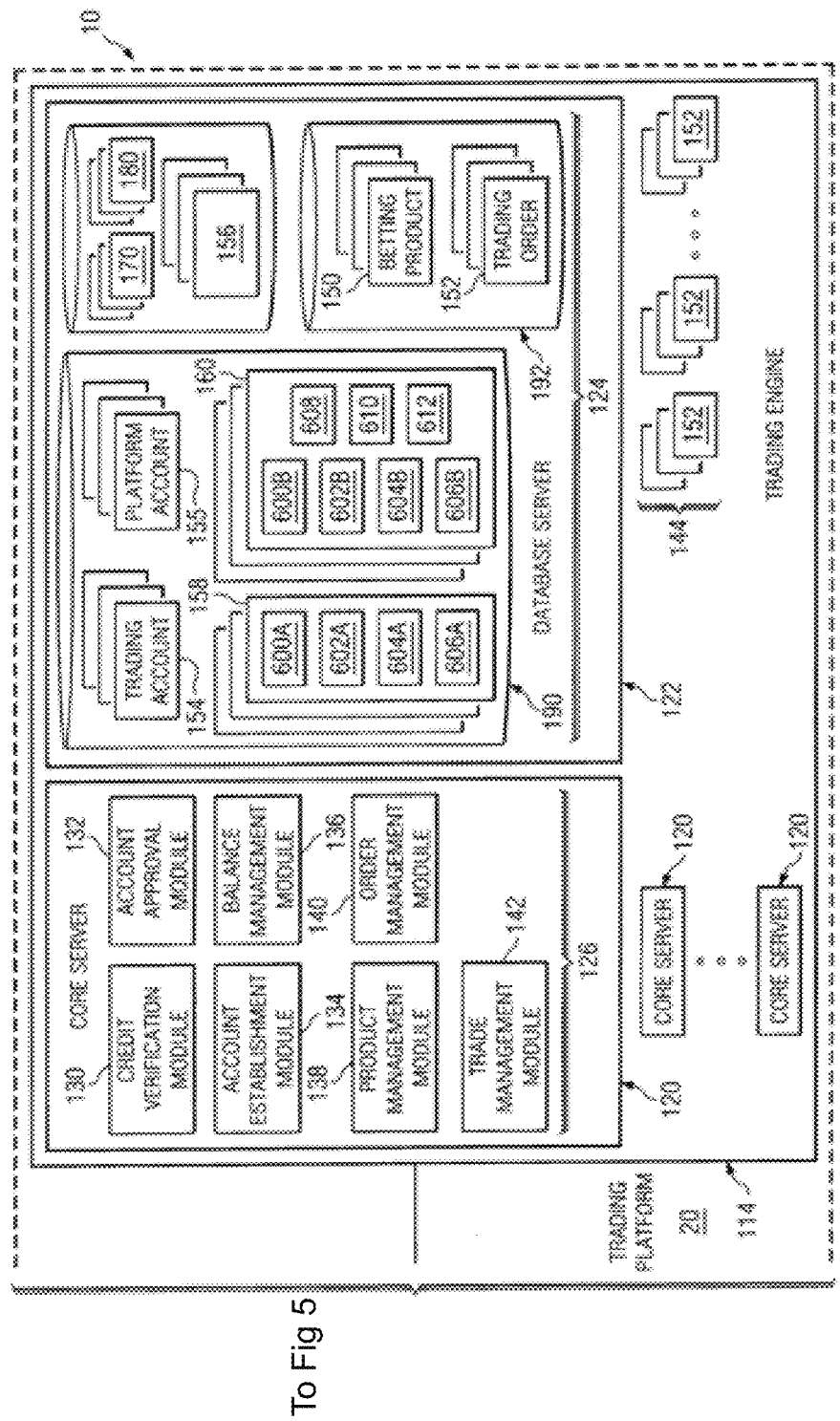
Figure 7:
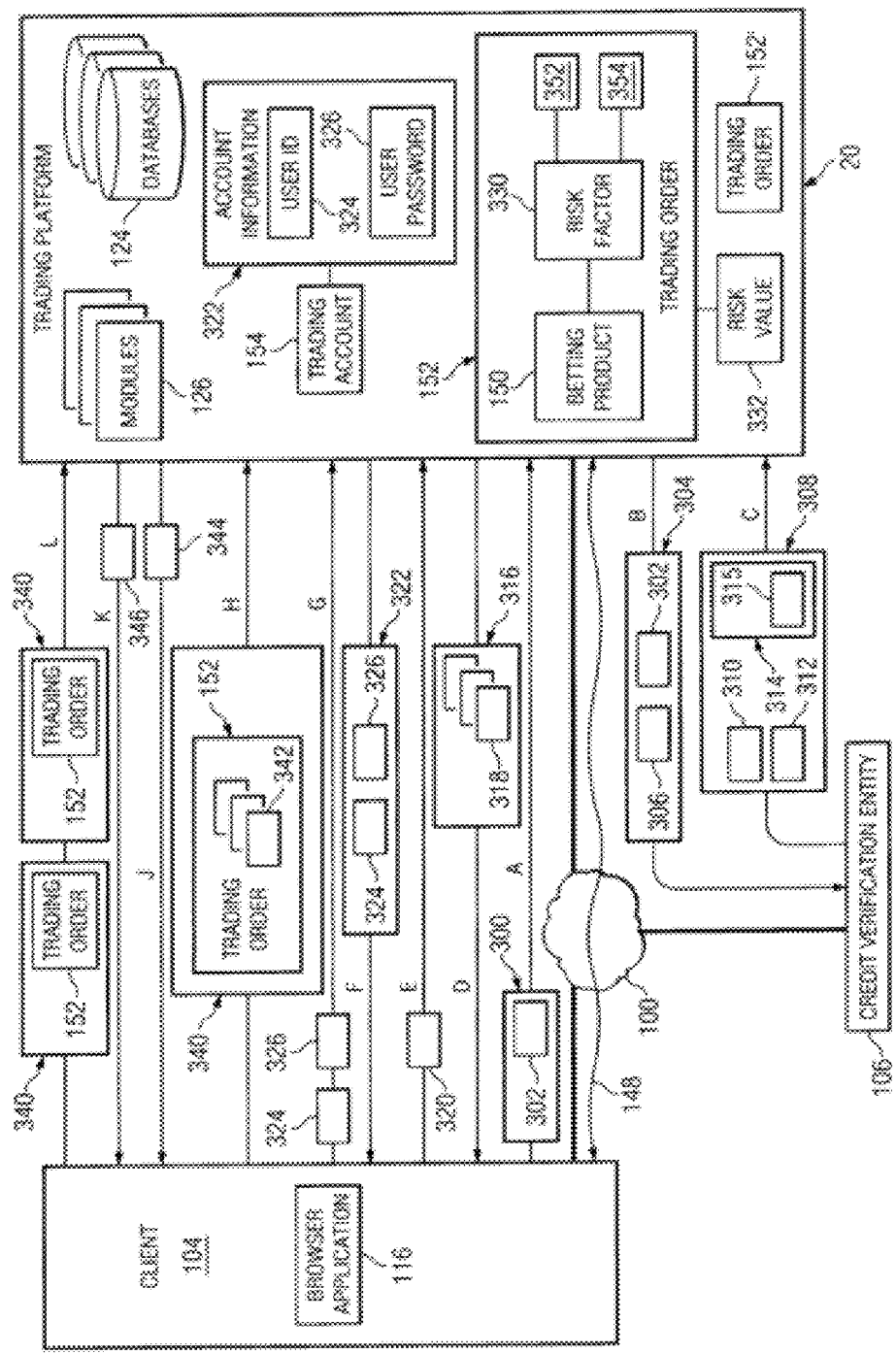

In some embodiments, wager system 201 may include an exchange-based wagering system. One example exchange based wagering system is described in U.S. patent application Ser. No. 10/831,375 to Burgis and entitled System and method for managing risk associated with product transactions, which is hereby incorporated herein by reference. In some embodiments, bid and/or offers for a wager may be received and wagers may be formed based on the bids and/or offers. A portion of this application, which may be used in some embodiments, and in which numerals refer to FIGS. 5, 6, and/or 7, states:

Trade management module 142 is generally operable to identify trading orders 152 which may be matched, and to match such trading orders 152 to execute trades. Generally, trade management module 142 identifies matches between trading orders 152 to buy particular betting products 150 and trading orders 152 to sell the same betting products 150. Trade management module 142 may identify trading orders 152 to be matched, or in other words, to determine whether to match particular trading orders 152, based at least on the relative quotes, or "prices," defined by the trading orders 152. For example, in some embodiments or scenarios, trade management module 142 may only match buy and sell trading orders 152 having the same quote or price. In other scenarios, trade management module 142 may match orders in which the quote or price for the buy order 152 is greater than or equal to the quote or price for the corresponding sell order 152. In still other embodiments or scenarios, trade management module 142 may only match orders in which the quote or price for the buy order 152 is greater than the quote or price for the corresponding sell order 152 by a predetermined amount or percentage. In this manner, trade management module 142 may match trading orders 152 to execute trades.

In still other embodiments or scenarios, trade management module 142 may match orders in which the quote or price for the buy order 152 is greater than or equal to the quote or price for the corresponding sell order 152, as well as orders in which the quote or price for the buy order 152 is lower than, but within a particular price differential of, the quote or price for the corresponding sell order 152.

As discussed above, order management module 140 may store (or cause the storage of) trading orders 152 in queues in a predefined manner, such as according to a FIFO (first in, first out) basis and/or according to the offered quote or price of each trading order 152. Trade management module 142 may utilize such queues 144 in order to identify and determine whether to match particular trading orders 152. In addition, trade management module 142 may partially or fully match particular trading orders 152, depending on the unit stake of each trading order 152 involved in the trade. For example, suppose User A places a trading order 152 to sell a particular betting product 150, betting product X, for $10/point (unit stake) at 42 points (quote). Later, User B places a trading order 152 to sell betting product X for $5/point (unit stake) at 42 points (quote). Still later, User C places a trading order 152 to buy betting product X for $25/point (unit stake) at 42 points (quote).

Since User A's and User B's trading orders 152 may be stored in a first queue 144 in FIFO order, User A's order will be ahead of User B's order in first queue 144. Thus, trade management module 142 will first match $10/point of the unit stake of User C's buy order with the $10/point unit stake of User A's sell order to execute a first trade. Trade management module 142 will then proceed to the next order in first queue 144, namely User B's order, and match $5/point of the unit stake of User C's buy order with the $5/point unit stake of User B's sell order to execute a second trade. Order management module 140 may then store the remaining unmatched $10/point unit stake of User C's buy order in a second queue 144, which may be matched by subsequently requested sell orders for betting product X at (or below) a quote of 42 points.

In some embodiments, trade management module 142 notifies balance management module 136 each time a trade is fully or partially executed (in other words, each time a trading order 152 is fully or partially matched with another trading order 152), such that balance management module 136 may update one or more current balances 160 for the trading accounts 154 of each involved user. For example, when a trading order 152 is fully matched, balance management module 136 may increase the used margin balance 612 and decrease both the available waived margin balance 604B and the an available total margin balance 606B in both the buyer's and the seller's trading accounts 154 by an amount equal to the risk value 332 determined for the buyer's and the seller's relative positions in the trading order 152. When a trading order 152 is partially matched, balance management module 136 may increase the used margin balance 612 and decrease both the available waived margin balance 604B and the an available total margin balance 606B in each of the buyer's and the seller's trading accounts 154 by an amount equal to the risk factor 330 of the underlying betting product 150 for the buyer's and the seller's relative positions, multiplied by the portion of the unit stake of the trading order 152 which was matched. As discussed above, in some embodiments, balance management module 136 may reduce and/or increase one or more current balances 160 in the buyer's and/or seller's trading accounts 154 in a particular order. In this manner, balance management module 136 may manage various current balances 160 in each trading account 154 over time based on trading activity performed using such trading accounts 154.

In addition, balance management module 136 may update one or more current balances 160 for each relevant trading account 154 each time order management module 140 updates the risk value 332 of a trading order 152 placed on trading platform 20. For example, suppose in the example discussed above in regarding the American football game that 28 points have been scored by halftime. Product management module 138 may update the risk factor 330 for the buyer's from 33 points to 5 points, such as described above. As a result, balance management module 136 may update one or more current balances 160 for the buyer which are tied to the updated risk factor 330, such as the used margin balance 612, the available waived margin balance 604B or the available total margin balance 606B, for example. Such updated balances 160 may affect the amount available for trading 620 in the buyer's trading account 154.

In some embodiments, as balance management module 136 updates one or more current balances 160 for a particular user's trading account 154, order management module 140 may determine whether each remaining unmatched, or open, trading order 152 placed using that trading account 154 is still valid according to the updated current balances 160. For example, if balance management module 136 reduces the available waived margin balance 604B and the available total margin balance 606B in a trading account 154, which affects the amount available for trading 620 in the user's trading account 154, order management module 140 may determine whether the updated amount available for trading 620 is sufficient to maintain each remaining unmatched trading order 152 made using that trading account 154.

For example, order management module 140 may compare the risk value 332 of each remaining unmatched trading order 152 with the updated amount available for trading 620 in the trading account 154. For each trading order 152, if the risk value 332 of that trading order 152 is less than or equal to the updated amount available for trading 620, the trading order 152 is unaffected. However, for each trading order 152 having a risk value 332 greater than the updated amount available for trading 620, the unit stake of that trading order 152 may be reduced such that the risk value 332 of the trading order 152 is reduced to an amount equal to (or less than) the updated amount available for trading 620.

For example, suppose a user has a trading account 154 having an amount available for trading 620 of $10,000 and several open trading orders 152, including the following:

Order A: sell order for $200/point at 15 points; risk factor of 15 points for a risk value of $3,000.

Order B: buy order for $200/run at 50 runs; risk factor of 30 runs for a risk value of $6,000.

Order C: sell order for $3,000/goal at 4.5 goals; risk factor of 3 goals for a risk value of $9,000.

Suppose that Order A is fully matched, and that balance management module 136 reduces the amount available for trading 620 in trading account 154 by the amount equal to the risk value 332 of Order A ($3,000) from $10,000 to $7,000. Order management module 140 may then determine whether the updated amount available for trading 620 of $7,000 is sufficient to maintain each of the user's remaining unmatched trading orders 152, namely Order B and Order C. Since the risk value 332 of Order B ($6,000) is less than the updated amount available for trading 620 of $7,000, Order B remains unaltered. However, since the risk value 332 of Order C ($9,000) is greater than the updated amount available for trading 620 of $7,000, the unit stake of Order C is reduced from $3,000/goal to $2,333.33/goal such that the updated risk value 332 of Order C is $7,000 (in other words, 3 goals*$2,333.33/goal).

In some embodiments, order management module 140 may increase the unit stake of trading orders 152 that were previously decreased, such as described above, if the amount available for trading 620 in the relevant trading account 154 is increased. For example, in the example discussed above, if the amount available for trading 620 in the user's trading account 154 is subsequently increased above $7,000, the unit stake of Order C may be increased accordingly up to the original $3,000/goal.

It should be recognized that the above example of a exchange based wagering system is given as a non-limiting example only. In some embodiments, a wager system 201 may receive an indication of a fantasy sports team on which a wager is desired. Wagering system 201 may transmit an indication of information related to the fantasy sports team to one or more potential counter parties. The information may include characteristics of the team, statistics related to the team, desired wager amounts, and/or any desired information. Wagering system 201 may receive one or more bids to enter into a wager related to the fantasy sports team. Each bid may include an indication of a respective second fantasy team against which the first fantasy team may play in a formed wager. Wagering system 201 may form one or more wagers based on the bids to fulfill the desires of the initial submitter of the first fantasy sports team. In some embodiments, a submitter of the first fantasy sports team may be provided with an indication of the bids and be allowed to select the bids that may be used to form the one or more wagers. In some embodiments, a performance value related to each of the teams used to form a wager may be used to determine a payout ratio for the wager. In some embodiments, wagers may be formed between the participants.

In some embodiments, a casino or other venue may act as an intermediary (e.g., wager server) between wagers involving the players. For example, in response to a match, a casino may enter into two offsetting wagers. In some embodiments, a window of time may be set for particular wagering opportunities (e.g., wagering opportunities for particular teams, wagering opportunities for a fantasy game, wagering opportunities with a particular characteristic, and so on). Some examples of a wagering portal that may be used in some embodiments are described in U.S. patent application Ser. No. 12/979,546, which is hereby incorporated herein by reference.

Event server 203 may be configured to receive and/or process information regarding events. The events may include real life sporting events. For example, events may include hits, runs, completed passes, incomplete passes, interceptions, catches, bases stole, blocks, three point shots, steals, fumbles, shots on goal, and/or any other information. Events may include events at a recent game and/or events from non-recent games. Events may be received substantially simultaneously as the event happening.

Event server 203 may determine fantasy sport outcomes and/or points based on the events. For example, in an embodiment in which a participant receives a point if a real life player that corresponds to a member of the participant's fantasy sports team scores a touchdown, then the event server may be configured to add a point to the participant when information identifying that the player scored the touchdown is received. In some embodiments, event server 203 may be configured to maintain historical records of event information. Such information may be used periodically to determine outcomes and/or points. In some embodiments, event information may be used to determine performance values for a fantasy sports team.

Some examples of receiving and processing event information are described in U.S. patent application Ser. No. 12/367,566 to Plott and entitled Mobile Gaming Alert, which is hereby incorporated herein by reference.

Network 205 may include and desired communication network or networks. Network 205 may include wired portions and/or wireless portions. Network 205 may include a local network, the internet, and/or any desired network. Network 205 may allow portions of system 200 to communicate among one another and/or outside systems.

Client computing device 207 may include any desired computing device. Client computing device may be configured to allow a participant to enter and/or access information regarding a fantasy sports game. For example, client computing device 207 may include a network connected computer at a casino, at a remote location, and/or at any desired location. Client computing device 207 may include a special purpose computer configured to display sporting statistics, game feeds, wager option and so on, on one or more displays. Client computing device 207 may include input and/or output elements for money related to one or more wagers (e.g., a ticket in ticket out device, a credit card device, a cash dispenser, a cash intake element, etc.). Client computing device 207 may communicate with one or more other elements of system 200, such as wager system 201 to submit or receive information. System 200 may include any number of client computing devices that may allow any number of participants to play any number of fantasy sports games.

Staff computing device 209 may include a computing device configured to be operated by a staff member of a gaming establishment, such as a casino. Staff computing device 209 may include a device at a sports book at which a participant may tell a staff member about a desired wager, the staff member may enter the information to create a wager, a bid for a wager, a fantasy sports team, and so on.

Mobile device 211 may include any desired mobile computing device. For example, mobile device 211 may include a mobile telecommunications device such as a cell phone, a mobile gaming device and so on. An example mobile gaming device is described in U.S. patent application Ser. No. 11/868,013 to Lutnick and entitled Game of Chance Processing Apparatus, which is hereby incorporated herein by reference. Other example mobile gaming devices may include tablet computers, smart phones, and so on. Mobile device 211 may communicate over a wireless network, such as a portion of network 205. Mobile device 211 may allow a participant to enter and/or receive information related to a fantasy sports team and/or game.

Event source 213 may include any desired source of information related to events. For example, event source 213 may include a television, an rss feed, a news feed, a news paper publication, an announcer, a web site, a log of events, a phone system, a television, and so on. Event source 213 may be part of system 200 or may be separate form system 200 (e.g., a system run by a sports league or television channel such as ESPN, NFL.com, and so on). Event source may be connected to the internet and provide information about events to system 200.

It should be recognized that system 200 is given as an example only. Various embodiments may include additional, alternative, fewer, different, and so on components as desired. For example, some embodiments may include a web server, an authentication server, and or other servers as desired. It should be recognized that system 200 may not be a singular system, but rather may include various components that may be owned, operated, and/or manufactured by different entities.

Figure 3:
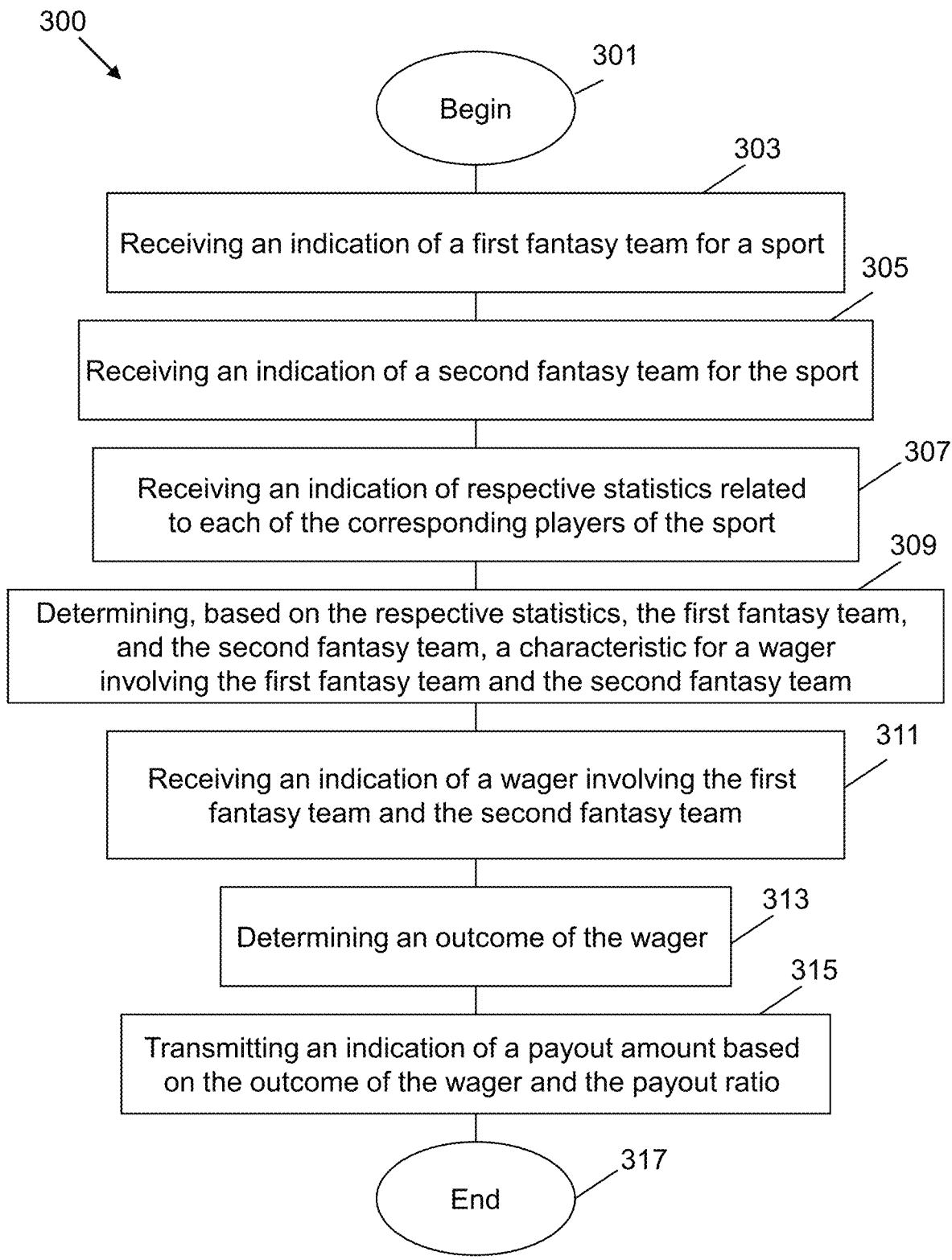
FIG. 3 shows an example process that may be performed in some embodiments.

FIG. 3 illustrates an example process 300 that may be performed in some embodiments. Process 300 may begin at block 301. Process 300 may be performed by system 200 and/or one or more components of system 200 such as wagering system 201, event server 203, a processor, and/or any other device.

As indicated at block 303, process 300 may include receiving an indication of a first fantasy team for a sport. The indication may be received from a computing device (e.g., a device operated by a participant, a client computing device a mobile computing device, staff computing device). In some embodiments, the first fantasy team may include a first plurality of members that each correspond to a respective player of the sport, as discussed above. Such a first team may include a casino team and/or a player team in some embodiments.

In some embodiments, the indication may include an indication of each of the members of the fantasy team. In some embodiments, the indication may include an indication of a position for one or more of the members of the fantasy team (e.g., quarterback). In some embodiments, an indication of a fantasy team may include an indication of an outcome of a draft. In some embodiments, an indication of a fantasy team may include an indication of a selection of members of the fantasy team (e.g., by a participant of a fantasy sports game, by a casino as part of a selection of one or more casino teams). Various examples of forming a team are described above and it should be recognized that an indication of such forming may be received in any number of ways in some embodiments.

Various examples of rules for a team involving uniqueness and other elements are described above. Some embodiments may include verifying that the team meets requirements.

In some embodiments, at least two of the first plurality of members may correspond to a same first player of the sport. It should be recognized that in various embodiments, any number of the members may correspond to the same first player. The members may be assigned same or different positions from one another and/or the real player, in various embodiments. In one example, all members on a team may correspond to a same first player. In some embodiments, two or more members of a team may correspond to respective players that play in a same position in the sport even if the sport only allows one player to play that position at one time. For example, in some embodiments, a fantasy team may include multiple members that correspond to players that play as quarterbacks.

It should be recognized that some embodiments may include assigning members to a position and some embodiments may not include assigning members to a position. Such assignment to a position may and/or may not be affected by non-unique members. In some embodiments, non-unique members may not be assigned positions at all and may earn points based on actions of the player regardless of position played by the player. In some embodiments, non-unique members may be assigned positions and may earn points based on actions of the player that are relevant to each assigned position.

As indicated at block 305, process 300 may include receiving an indication of a second fantasy team for the sport. Such receiving may be substantially similar to the receiving of block 303. Such receiving may be from a player of a fantasy sports game (e.g., a player that desires to play their selected team against a casino's selected team in a fantasy sports matchup). The second fantasy team may include a second plurality of members that each correspond to a respective player of the sport. The second fantasy team may include a casino team and/or a player team.

In some embodiments, at least one of the second plurality of members corresponds to the same first player of the sport discussed above. In some embodiments, for example, the first fantasy team includes one or more of the first player and the second fantasy team includes one or more of the first player. A combined number of times the first player is included in any number of times may not be limited in some embodiments. A combined number of times the first player is included in any number of times may be limited in some embodiments. In some embodiments, a number of members of a first team and a second team that are common may be limited (e.g., a second team may be rejected or otherwise not allowed to be selected if the number of common members exceeds a threshold number).

As indicated at block 307, process 300 may include receiving an indication of respective statistics related to each of the corresponding players of the sport. Statistics may include any information that may describe happenings in one or more sport. For example, statistics may include a statistic related to past performance of one or more players of the sport. For example, a statistic may include a number of completed passes, a number of yards run last game, a number of games played in a career, a current earn run average, a percentage of free throws made, and/or any desired information. Such an indication may be received from an event source (e.g., from a historical database of an event source). It should be recognized that any information regarding one or more members of one or more teams may be received in various embodiments. Such information may include information about prior games.

As indicated at block 309, process 300 may include determining, based on the respective statistics, the first fantasy team, and the second fantasy team, a characteristic (e.g., a payout ratio, a handicap, other odds, a minimum wager, a maximum wager, and so on) for a wager involving the first fantasy team and the second fantasy team. A payout ratio may include an amount that a participant associated with each respective team may be paid if they win a wager involving the two teams. In some embodiments determining the payout ratio may include determining the payout ratio so that a team with players that have better statistics may receive a lower payout than a team that includes players with worse statistics. A handicap may include an amount of points that one team must win against another team to be considered a win by the one team. A handicap may be determined such that a team with players that have better statistics may have to win by at least some number of points to be considered a winning team.

Some embodiments may include determining characteristics related to a wager and/or (possible) member of a team. For example, some embodiments may include determining an expected number of points that a team and/or member may earn in a game. For example, a fantasy team selected by a player and/or casino may include a number of members. A determination of a number of points that each team and/or member may earn in a fantasy game may be determined in some embodiments. In some embodiments, a determination based on such expectation may be used to determine a odds, moneyline, payout ratio, handicap, and/or other characteristic of a wager.

A determination of an expected number of points for a member may include determining a number of points that the member is expected to earn based on historic performance of the player. The historic performance may include performance from all prior games, recent prior game, prior games against an opponent (e.g., team, coach, player) that the member will be playing an upcoming real game that may be used as a basis for determining an outcome of a fantasy game, history of home and/or away games, and so on. Various weightings may be given to historic information to make such a determination. For example, recent games may be given more weight than non-recent games in determining an expected points. If an upcoming game is an away game, away games may be given more weight than home games. Games against same opponents may be given more weight than games against different opponents. It should be recognized that any combination of weights and information may be used in determining an expected number of points for a particular member as desired and that examples given are non-limiting. Such information may be displayed through one or more interfaces in some embodiments.

In one particular non-limiting example, player X may have an expected number of points to be earned in an upcoming game. In the past two seasons, player X may have earned an average of 70 points each game. In the current season, the player may have earned 60 points for two of the three games. One of the three games may have been against team A and member may have earned 80 points. Such information may be received in some embodiments. A determination of an expected points may be made by an algorithm that takes such information into account. For example, an expected number of points may be determined such that expected points are equal to 70 times A (e.g., 0.33)+70 times B (e.g., 0.33)+60 times C (e.g., 0.1)+60 times C (e.g., 0.1)+80 times D (e.g., 0.13). In this example embodiment such an expected number of points may equal 68.6.

In some embodiments, a sum of points of each member of a team may be used to determine an expected number of points for a team. For example, a sum of a casino team member may be used to determine an expected number of points that the casino team will earn. As another example, a sum of expected points for each member of a player team may be used to determine an expected number of points for a player team to earn in a game.

Some embodiments may include determining a characteristic for a wager based on such characteristics of a team. For example, a characteristic of a wager may be determined based on expected points of one or more teams and/or one or more members. For example, a handicap may be determined for a game involving two teams based on a comparison of expected pointed for each of the teams. For example, as a non-limiting example, if a first team has an expected number of points of 100 and a second team has an expected number of points of 110.5, a handicap may be 10.5 points. Such a handicap may include an amount of points that a second team may be required to win by in order for a wager on the second team to be a winning wager. Such information may be presented to a user through an interface (e.g., an interface for selecting a team, an interface for making a wager, and so on. In some embodiments, a house edge may be added to one or more sides or teams as desired.

It should be recognized that various examples of characteristic determination are given as non-limiting examples only. Other embodiments may include any desired methodology. For example, in some embodiments, actual expected events of a real game may be determined (e.g., expected passing yards, expected touchdowns), and based on such expected events, an expected score may be determined. As another example, some embodiments may include adjusting a characteristic based on other wagers (e.g., if many players wager on a particular team to win, the team may be given an increase in expected points; if a player that has a winning record wagers on a team to win, the team may have an adjustment made to the expected points, and so on).

In some embodiments, determining the payout ratio may include determining an expected performance value for the first team and/or the second team. An expected performance value may include an indicator of expected performance based upon statistics of players on a team. An expected performance value may include an indication of an expected number of points that a team may earn based on the statistical data. In some embodiments, a payout ratio may be based on a comparison of the two expected performance values (e.g., a ratio of the two values, a formula applied to the two values, etc.).

Some embodiments may include displaying one or more of the expected performance values and/or the payout ratio to a participant (e.g., a user associated with one of the teams). Such information may be used, for example to adjust a team, to verify a wager, and so on.

As indicated at block 311, process 300 may include receiving an indication of a wager involving the first fantasy team and the second fantasy team. The indication may be received from one or more client computers, from a wager system, and so on. The wager may include a wager that a first team may beat a second team (e.g., over a period of time, in a game, in a season, and so on) and/or a second team will beat a first team. The wager may include a wager that one fantasy team will outperform another fantasy team over a period of time. In some embodiments, a participant associated with one or more of the fantasy teams may view information related to the wager and/or verify the wager.

In some embodiments, various wager related actions may be performed, such as debiting and/or crediting accounts, obtaining signed contracts, collecting chips or money, and so on.

As indicated at block 313, process 300 may include determining an outcome of the wager. The outcome of the may be determined based on statics of events happening after the wager. For example, events related to players in the teams may be used to determine points for each team, as described above. A comparison of the points may be used to determine the winning team. In some embodiments, determining the outcome may include includes determining the outcome based on events in one or more games involving the players on each fantasy team. Some embodiments may include receiving an indication of the performance of the players (e.g., from an event source).

As indicated at block 315, process 300 may include transmitting an indication of a payout amount based on the outcome of the wager and the payout ratio/odds/moneyline. Such a payout amount may be determined based on the outcome and the payout ratio. Such an indication may be made to a client. In some embodiments, such an indication may include an indication that a payment was made. In some embodiments, such an indication may be displayed on a display. In some embodiments, such an indication may include an indication to a staff member to pay a participant an amount. In some embodiments, such an indication may include an indication that an amount should be transferred from one account to another account.

Process 300 may end at block 317. It should be recognized that process 300 is given as a non-limiting example only. Other embodiments may include additional, alternative, differently ordered, more, fewer, different, and/or same actions as desired. In some embodiments, for example, rather than a wager involving only two team, a wager may involve any number of teams, such as a league of participants.

Figure 4:
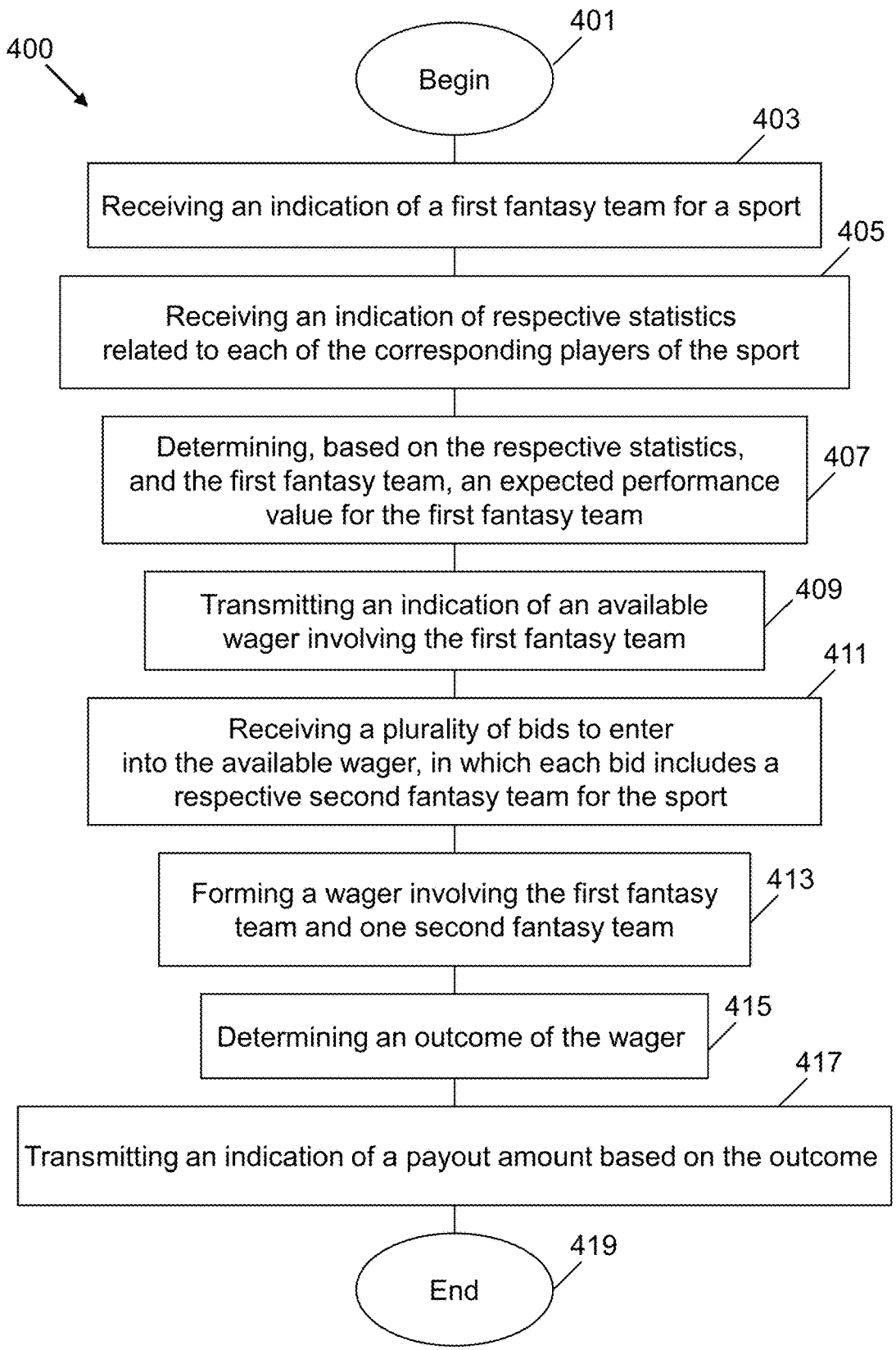
FIG. 4 shows an example process that may be performed in some embodiments.

FIG. 4 illustrates an example process 400 that may be performed in some embodiments. FIG. 4 may begin at block 401. Process 400 may be performed by system 200 and/or one or more components of system 200 such as wagering system 201, event server 203, a processor, and/or any other device.

As indicated at block 403, process 400 may include receiving an indication of a first fantasy team for a sport. In some embodiments, the first fantasy team may includes a first plurality of members that each correspond to a respective player of the sport. In some embodiments, at least two of the first plurality of members correspond to a same first player of the sport. Receiving the indication of the first fantasy team may be substantially similar to receiving the indication described above.

As indicated at block 405, process 400 may include receiving an indication of respective statistics related to each of the players on the first fantasy team. In some embodiments, statistics include a statistic related to past performance of the players in the sport. Receiving such information may be substantially similar as receiving statistics described above.

As indicated at block 407, process 400 may include determining, based on the respective statistics, and the first fantasy team, a first expected performance value for the first fantasy team. The first expected performance value may include a value associated with the statistics so that a team with players that have higher past performance statistics result in a higher performance value. In some embodiments, an expected performance value may include a numerical indicator of expected performance based upon statistics of players on a team. Determining an expected performance value may be substantially similar as described above.

As indicated at block 409, process 400 may include transmitting an indication of an available wager involving the first fantasy team. The indication may include an indication of the expected performance value. Such an indication may be presented on an exchange based wagering system as described above. For example, an indication of a desire to enter into a wager involving the first fantasy team may be presented to possible counter parties.

The indication of the expected performance value may be useful for possible counter parties. For example, such information may be used by such participants to determine how good a team is, how many stars are on a team, and so on.

As indicated at block 411, process 400 may include receiving a plurality of bids to enter into the available wager. In some embodiments, each bid includes a respective second fantasy team for the sport. Some examples of bidding related to wagers are described above with respect to exchange based wagering. In some embodiments, each bid includes a respective second expected performance value for a respective second team.

In some embodiments, bids may be selected to form a wager. In some embodiments, bids may be shown to a submitter of the first fantasy team and the submitter may select bids to accept. It should be recognized that any method of determining how one or more desires to enter into a wager involving the first fantasy team should be fulfilled may be used.

In some embodiments, a bid may include an amount to be wagered. In some embodiments, a bid may include one or more indications of a characteristic of a wager.

As indicated at block 413, process 400 may include forming a wager involving the first fantasy team and one second fantasy team associated with a bid. Such forming may be similar to matching bids and offers related to wagers in an exchange based wagering system, as described above. It should be recognized that any method of entering one person into a wager with another person or entity may be used in various embodiments. Some embodiments may include forming a plurality of wagers. For example, a house may enter into a wager with a first player that submitted the first team and one or more other wagers with one or more other players that submitted bids. Accordingly, the house may act as an intermediary rather than the players having wagers directly against each other, they would have wagers with the house.

In some embodiments, the wager may include a wager that a first fantasy team will outperform a second fantasy team over a period of time. In some embodiments, the second fantasy team may include a plurality of members corresponds to the same first player of the sport.

Some embodiments may include determining an expected performance value for each of the second fantasy sports teams. Such expected performance values may be determined substantially similarly to the determinations described above.

In some embodiments, one or more characteristics of a wager may be determined based on one or more expected performance value. For example, in some embodiments, a comparison of an expected performance value of a first fantasy team with an expected performance value of a second fantasy team may be used to determine a spread or handicap for a wager involving the two teams. For example, in some embodiments, a payout ratio or other odds for the wager may be determined based on a comparison of the expected performance ratios.

In some embodiments, a bid for a wager may include an indication of one or more characteristics for the wager. For example, a bid may include an indication of a payout ratio for the wager, an amount of a wager, a maximum amount of a wager, a handicap, and so on. Such information may be used to select one bid over another. For example, in some embodiments, a bid may be selected to form the wager based on an expected performance value of the second team and/or a payout ratio proposed by the bid. For example, a bid that has a most favorable comparison of expected performance value to payout ratio may be selected for the wager. Such a selection may take place by a computing device and/or a submitter of the first fantasy team. In some embodiments, a bid may be selected so that a payout ratio compared to a ratio of expected performance values is most beneficial to a submitter of one of the bid and the first fantasy team. Some embodiments may include selecting the a second team such that a comparison shows that the respective payout ratio associated with a bid that includes the second team is greater from the point of view of the submitter of the first team than a ratio of the first expected performance value to the second expected performance ratio.

In some embodiments, a casino may determine a characteristic for a wager involving two players, and/or a wager with the casino for each of two players. For example, a casino may determine a handicap, a payout ratio, odds, and so on for such a wager based on expected number of points that each team may score.

As indicated at block 415, some embodiments may include determining an outcome of a wager. A wager may include a wager involving the first fantasy team and/or one or more respective second teams. A wager may include a wager involving two players. A wage may include a wager involving a player and a casino. Various examples of determining an outcome are described herein.

As indicated at block 417, process 400 may include transmitting an indication of a payout amount based on the outcome. Such transmitting may be substantially similar to transmitting described above.

In some embodiments, a wager may include a wager between a casino an each of the two players rather than between the two players.

Process 400 may end at block 419. It should be recognized that process 400 is given as a non-limiting example only. Other embodiments may include additional, alternative, differently ordered, more, fewer, different, and/or same actions as desired.

In some embodiments, a player may enter two teams for a wager and may place a wager that one entered team outperforms another entered team. A casino may take an opposite side of the wager and/or another player may take the opposite side of the wager (e.g., with or without a casino acting as an intermediary). In some such embodiments, a casino may determine a handicap for each team and may allow a user to select a side to take based on such a handicap.

In some embodiments, rather than and/or in addition to a bidding system, some e embodiments may include a first in first out system, a system based on wagered amounts, and/or any other system of matching desires to enter into wagers. For example, a first player may identify that they desire a wager of 10,000 on team A against team B. A first player that accepts such a wager may be matched with the player and entered into the wager. Such a wager may include a lower amount (e./g., a lower amount that the second player desires). Such a wager may include a wager with a casino as an intermediary (e.g., two wagers, one with each player).

It should be recognized that process 300 and process 400 as well as systems in FIGS. 1 and 2 are given as non-limiting examples only. Various embodiments may include any desired processes and/or apparatus as desired.

In some embodiments, a casino and/or player may establish one or more fantasy teams (e.g., two) for a game. For example, on Tuesday, a casino may establish two teams for a coming week of games and/or a player may submit one or more teams that they desire to enter into wagers regarding. The teams may be established based on players of sports that are expected to play in coming games (e.g., non-injured players, players scheduled to start).

One or more teams (e.g., a set of casino teams) may be established such that at least one team includes players that have a low standard deviation in their game performance compared to at least one other player (e.g., a team of consistent players). The teams may be established such that at least one team includes players that are expected to perform very well compared to other players (e.g., a team of starts). For example, some embodiments may include receiving information identifying historic performance of one or more players. A member of a team may be selected such that the member includes a lower standard deviation of performance in the historic games than other members. Some embodiments may include a player that has good performance and stable performance when compared to other players.

A casino may determine an expected points that each of such teams may earn. Such points may be determined based on historic data in some embodiments. Such points may be determined based on similarities between prior games and an upcoming game.

Some embodiments may include receiving an indication of a team from a player. A player may select member of the team through an interface and/or may select a previously created team. The player may be prevented from selecting one or more member of the team if they have been selected by a casino for a team in some embodiments. In other embodiments such prevention may not take place. Such selection may take place after a casino has established one or more teams (e.g., before a set of games that may be used to determine results of a fantasy game begins). A selection of one of the casino teams may be made for a wager that involves the player team and the selected team.

A determination of a number of points that the player's team may earn may be made. Such points may be determined based on historic data in some embodiments. Such points may be determined based on similarities between prior games and an upcoming game. A determination of a handicap for a game between the casino team and the player team may be determined and provided to a player.

A wager based on the teams and with the handicap may be received from the player. An outcome may be determined based on events in real games. A payment may be made for a winning wager.

In some embodiments, a payout may be a static payout based on a wager amount. For example a bet of 1.10 may return a 1.00 for a win (e.g., the player may win a dollar for every dollar and ten cents the player wagers and wins). In some embodiments a payout may be based on a different in scores. For example, the more a player's team wins by, the more the player may win (e.g., a player may win an extra 10 cents per point per dollar). In some embodiments, a payout may include a pari-mutuel payout. For example, each player that enters into a wager against a casino team (a particular casino team, any of a set of casino teams) may have at least a part of their wager money placed in a pari-mutuel pool. A winner may win the pari-mutuel pool or a part of such a pool. For example, winners may share the pool in proportion to a wager amount, and/or a winner may be a player whose team earns a most amount of points over a handicap. It should be recognized that various payouts are given as examples only.

In some embodiments, a team may include a particular required make up. For example, a team selected by a player may be required to include 1 Quarterback, 2 Running Backs, 2 Wide Receivers or Tight Ends, 1 Kicker, and 1 Defense. In some embodiments the defense may include a team's defense (e.g., the defense of the Bears) rather than a individual player as in the quarterback.

In some embodiments, scoring may include QB/RB/WR/TE: 6 pts for every rushing or receiving TD, 6 pts for player returning kick/punt for TD, 6 pts for player returning or recovering interception/fumble for TD, 4 pts for every passing TD, 2 pts for every rushing or receiving 2-pt conversion, 2 pts per passing 2-pt conversion, 1 pt per 10 yards rushing or receiving, 1 pt per 25 yards passing; KICKER: 5 pts per 50+ yard FG made, 4 pts per 40-49 yard FG made, 3 pts per 39 yard or less FG made, 2 pts per rushing, receiving or passing 2-pt conversion, 1 pt per extra point made; DEFENSE: 10 pts for 0 points allowed, 7 pts for 2-6 points allowed, 4 pts for 7-13 points allowed, 1 pt for 14-17 points allowed, 0 pts for 18-21 points allowed, −1 pt for 22-27 points allowed, −4 pts for 28-34 points allowed, −7 pts for 35-45 points allowed, −10 points for 46 or more points allowed, 3 pts per defensive or special teams' TD, 2 pts per interception, 2 pts per fumble recovery, 2 pts per blocked punt, PAT, or FG, 2 pts per safety, 1 pt per sack. Such examples are given as non-limited only. In various embodiments points may be earned and/or lost based on any desired events occurring.

Some embodiments may include adjusting one or more teams and/or one or more offered wagers based on one or more prior wagers.

For example, in some embodiments, one or more wagers may be made that one or more fantasy teams will win a game. Such fantasy teams may include a common member. Accordingly, a determination may be made that a casino that accepts those wagers (e.g., that takes the side that the one or more fantasy teams will lose) has taken an amount of risk that the common member will perform well. Conversely, an opposite determination may be made if a casino has accepted wagers that one or more teams with a common member will lose because such wagers may amount to the casino taking on risk that that player performs well.

A casino team may be adjusted to include or exclude such a common member based on such a determination. In some embodiments, for example, a casino may determine that most players wager against offered casino teams and that they have taken on risk that a particular member will perform well. In response to such a determination, the casino may add that member to a casino team to encourage wagers against that member. In some embodiments, if a member is on a casino team and the casino has taken on risk that the player performs poorly, the casino may remove the member from the team and add a replacement member for future wagers.

In other embodiments, selection of such a common member for inclusion on a team may be restricted, and/or acceptance of wagers on one direction or another may be restricted based on such a determination.

Some embodiments may include voiding one or more wagers based on actions that occur after a wager is placed. For example, if a member of a team involved in a wager is injured, the wager may be voided. In some embodiments, if a member of one of the teams does not play in a game the wager may be void. Different rules may apply in different games and/or to different members. For example, a wager may not be void if a kicker does not play in a football game because there is no kicking opportunity in a game, and/or a defense does not play in a football game because there is no defensive opportunity, but a wager may be voided if a quarterback does not play.

It should be recognized that while some embodiments may describe determining odds, pay ratios, handicaps, and/or other characteristics of one or more wagers involving pairs of teams, some embodiments may include determining characteristics for a league and/or for any number of teams in a matchup. For example, a three team matchup may include determining odds that any one of the three teams wins and/or assigning handicaps for each team with respect to another team, and/or determining payout ratios for each team if they win, and so on.

Figure 8:
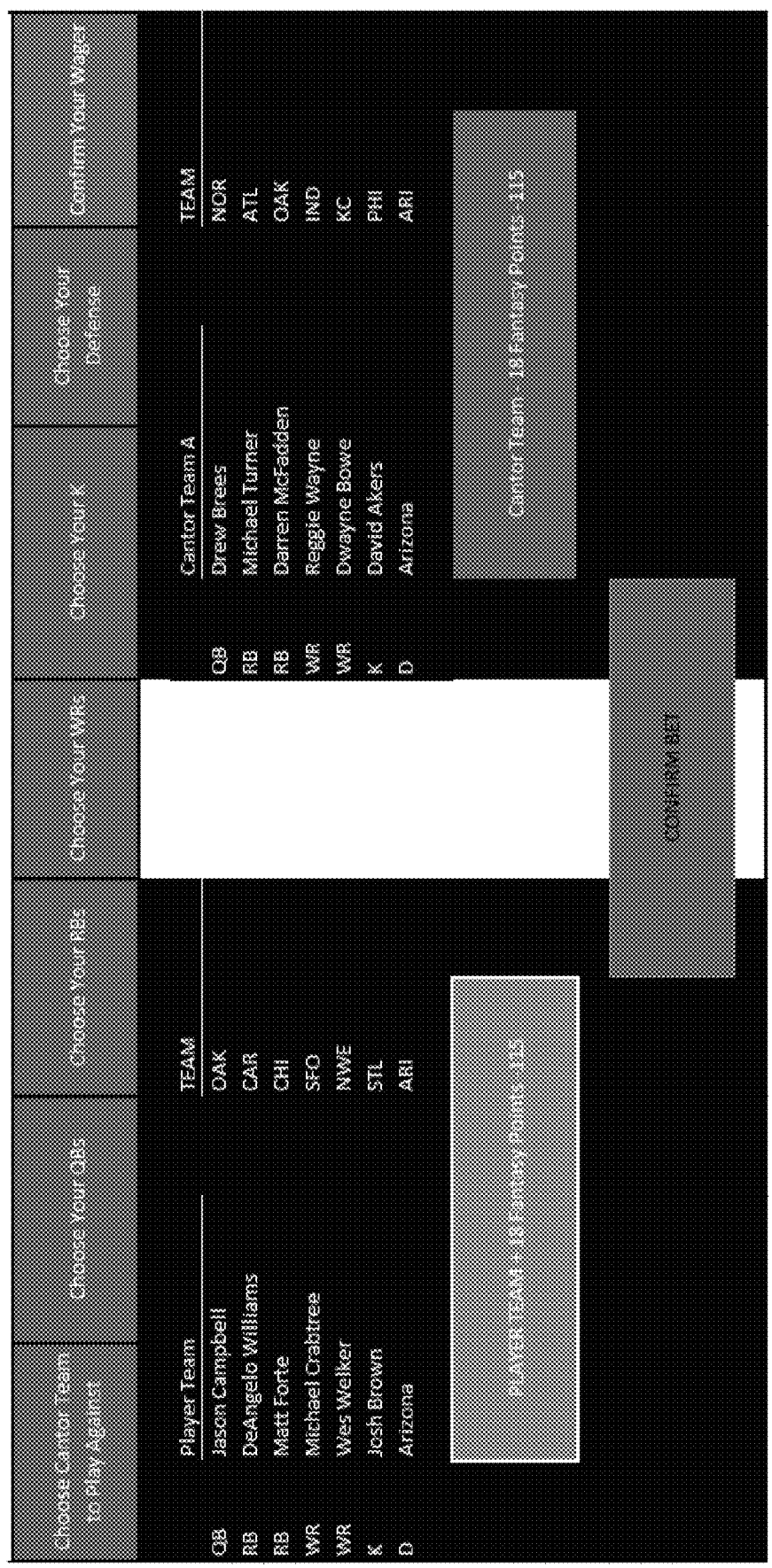
FIG. 8 shows an example interface that may be used in some embodiments.

FIG. 8 illustrates an example interface through which a user may enter information regarding a wager. For example, a user may choose members of a team, view odds, choose a side to wager on, confirm a wager, and so on through such an interface. In the illustrated interface, a user has selected a player team and chosen a casino team for the player team to play against. The casino and player team share a defense. A handicap of 18 points has been determined (e.g., the player team has an 1 point advantage), and a money line of −115 has been determine (e.g., $115 must be wagered to win $100).

It should be recognized that while some embodiments may include determining a single money lien and/or handicap, some embodiments may include determining a different handicap for one team than another and/or a different money lien for one team or another. Some embodiments may include an even money line, no handicap, and so on in any combination as desired. For example, in some embodiments there may be no handicap and there may be different money lines.

It should be recognized that while various embodiments are given in terms of football, other embodiments are not limited to football. Some embodiments may include other sports and/or other events as desired and may include different rules for different events as desired. For example different sports may include different numbers of players, different wager characteristics, and so on.

It should be recognized that reference to a casino are non-limiting and may include any intermediary, gaming operator, sports book, and so on.

It should be recognized that various orderings of actions are non-limiting. For example, a player may select a team before a casino team is presented and/or a casino team may be presented before a player selects a team. In some embodiments where a player selects a team first, casino teams that do not include selected players may be displayed but other casino teams may not be displayed.

It should be recognized that while various embodiments may be referred to as having a casino perform one or more actions, that such an identification of a casino is given as a non-limiting example only. In other embodiments, any entity and/or entities may perform any desired action sin any combination. For example, a gaming provider, a sports book, a server, a processor, a computer system, and so on may perform one or more actions.

What is claimed is:
1. An apparatus comprising:
at least one processor configured to control:
receiving an indication of a first fantasy team for an event from a first user, in which the first fantasy team includes a first plurality of members that each correspond to a respective participant in the event;
determining, based on at least a first part of received statistics and the first fantasy team, a first expected performance value for the first fantasy team;
presenting the first user with an indication of the first expected performance value;
receiving an indication of an alteration to the first fantasy team that results in a second fantasy team, in which the second fantasy team includes a second plurality of members that each correspond to a respective participant in the event;
determining, based on at least a second part of the received statistics and the second fantasy team, a second expected performance value of the second fantasy team;
presenting the first user with an indication of the second expected performance value;
receiving a third fantasy team from a second user, in which the third fantasy team includes a third plurality of members that each correspond to a respective participant in the event chosen by the second user;

determining, based on at least a third part of received statistics and the third fantasy team, a third expected performance value for the third fantasy team;

presenting the second user with an indication of the third expected performance value;

determining a characteristic for a fantasy game involving the second fantasy team and the third fantasy team defined by the second expected performance value and the third expected performance value, and forming the fantasy game defined by the characteristic and involving the second fantasy team and third fantasy team between the first user and the second user; and determining an outcome of the fantasy game based on the characteristic and performance of the second and third pluralities of members.

2. The apparatus of claim 1, in which the characteristic includes a handicap.

3. The apparatus of claim 1, in which at least one member of the second plurality of members and the third plurality of members corresponds to the same first participant in the event.

4. The apparatus of claim 1, in which the received statistics includes a statistic related to past performance of participants in a given event.

5. The apparatus of claim 1, in which the first expected performance value, the second expected performance value, and the third expected performance value each include a respective numerical indicator of expected performance based upon statistics of participants.

6. The apparatus of claim 1, in which the first expected performance value, the second expected performance value, and the third expected performance value each include respective points expected to be earned in the fantasy game.

7. The apparatus of claim 1, in which the fantasy game includes respective wagers that the second fantasy team will outperform the first fantasy team over a period of time in view of the characteristic.

8. The apparatus of claim 1, in which determining the outcome of the fantasy game includes determining the outcome based on events in one or more games involving the second and third pluralities of members.

9. The apparatus of claim 8, in which the at least one processor is configured to control receiving an indication of the performance of the second and third pluralities of members in the one or more games.

10. The apparatus of claim 1, in which each of the first expected performance value, the second expected performance value, and the third expected performance value includes a respective amount of points.

11. A method comprising:

controlling, by at least one processor as a networked gaming service:

determining a first fantasy team for an event, in which the first fantasy team includes a first plurality of members that each correspond to a respective participant in the event;

determining, based on at least a first part of received statistics from at least one networked data source and the first fantasy team, a first expected performance value for the first fantasy team in a fantasy game;

receiving, from a remote client device of a user, an indication of a second fantasy team for the event, in which the second fantasy team includes a second plurality of members that each correspond to a respective participant in the event, in which the indication of the second fantasy team identifies each of the second plurality of members chosen by the user, determining, based on at least a second part of the received statistics and the second fantasy team, a second expected performance value of the second fantasy team in a fantasy game;

populating a gaming interface of the remote client device of the user with an indication of the second expected performance value;

receiving, from the remote client device of the user, an indication of a third fantasy team that includes at least one different member than the second fantasy team;

determining, based on at least a third part of the received statistics and the second fantasy team, a third expected performance value of the third fantasy team in the fantasy game;

populating the gaming interface of the remote client device of the user with an indication of the third expected performance value;

determining a characteristic for the fantasy game, in which the characteristic is defined by the first expected performance value and the third expected performance value, and forming the fantasy game defined by the characteristic and involving the second fantasy team and third fantasy team; and determining an outcome of the fantasy game based on the characteristic and performance of the first plurality of members and the second pluralities of members with the one different member.

12. The method of claim 11, in which the first fantasy team is determined based on a received indication of the first fantasy team that identifies each of the first plurality of members, and in which the indication of the first fantasy team and the second fantasy team are received from the user.

* * * * *